(12) United States Patent
Minamikawa et al.

(10) Patent No.: US 12,149,666 B2
(45) Date of Patent: Nov. 19, 2024

(54) PRINTING SYSTEM EXECUTING TWO OR MORE TARGET JOBS IN RESPONSE TO COMPLETION OF SETTLEMENT OF TOTAL FEE

(71) Applicant: BROTHER KOGYO KABUSHIKI KAISHA, Nagoya (JP)

(72) Inventors: Shunsuke Minamikawa, Nagoya (JP); Haruka Azechi, Nagoya (JP); Yushi Deura, Nagoya (JP); Tetsuya Okuno, Nagoya (JP); Ayaka Hotta, Kitanagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/935,719

(22) Filed: Sep. 27, 2022

(65) Prior Publication Data
US 2023/0020402 A1 Jan. 19, 2023

Related U.S. Application Data

(63) Continuation of application No. PCT/JP2021/010552, filed on Mar. 16, 2021.

(30) Foreign Application Priority Data

Mar. 31, 2020 (JP) .................. 2020-064940

(51) Int. Cl.
*H04N 1/34* (2006.01)
*G06F 3/12* (2006.01)

(52) U.S. Cl.
CPC ........... *H04N 1/342* (2013.01); *G06F 3/1207* (2013.01); *G06F 3/1238* (2013.01); *G06F 3/1267* (2013.01); *G06F 2206/1504* (2013.01)

(58) Field of Classification Search
CPC ........... H04N 1/34–348; G06F 3/1207; G06F 3/1238; G06F 3/1267; G06F 2206/1504
See application file for complete search history.

(56) References Cited

U.S. PATENT DOCUMENTS

2001/0034747 A1* 10/2001 Fujitani ................. G06F 3/1238
715/234
2002/0154332 A1* 10/2002 Inai ....................... G06F 3/1238
358/1.15

(Continued)

FOREIGN PATENT DOCUMENTS

JP    2011233032 A    11/2011
JP    2018118406 A     8/2018

(Continued)

OTHER PUBLICATIONS

International Preliminary Report on Patentability and Written Opinion from PCT/JP2021/010552 dated Sep. 29, 2022 together with English language translation.

(Continued)

*Primary Examiner* — Nicholas Pachol
(74) *Attorney, Agent, or Firm* — Scully, Scott, Murphy & Presser, P.C.

(57) ABSTRACT

A printing system includes a printing mechanism. The printing mechanism is configured to perform printing. The printing system stores a plurality of print jobs in a storage, and receives selections of two or more print jobs to be executed as two or more target jobs from among the plurality of print jobs stored in the storage. The printing system determines a total fee to be charged for executing the two or more target jobs, and performs a settlement related process related to settlement of the determined total fee. The printing system executes the two or more target jobs to print images by using the printing mechanism in response to completion of settlement of the total fee.

17 Claims, 20 Drawing Sheets

(56) References Cited

U.S. PATENT DOCUMENTS

| | | | | |
|---|---|---|---|---|
| 2010/0027054 | A1* | 2/2010 | Reddy | G06F 3/1236 |
| | | | | 358/1.15 |
| 2010/0253968 | A1* | 10/2010 | Nuggehalli | G06F 3/1285 |
| | | | | 358/1.15 |
| 2011/0267636 | A1* | 11/2011 | Kamasuka | G06F 21/608 |
| | | | | 358/1.14 |
| 2011/0267647 | A1* | 11/2011 | Kamasuka | G06F 3/1288 |
| | | | | 358/1.15 |
| 2015/0371118 | A1* | 12/2015 | Lin | G06F 3/1285 |
| | | | | 358/1.15 |
| 2016/0295067 | A1* | 10/2016 | Miyahara | G06F 3/1296 |
| 2017/0068493 | A1* | 3/2017 | Kulkarni | G06F 3/1288 |
| 2017/0230536 | A1* | 8/2017 | Haapanen | G06F 3/1292 |
| 2018/0213115 | A1 | 7/2018 | Sun et al. | |
| 2019/0364158 | A1* | 11/2019 | Curry | G06Q 20/322 |
| 2019/0377533 | A1* | 12/2019 | Tonouchi | G06F 3/1203 |
| 2020/0213472 | A1* | 7/2020 | Sheng | G06Q 20/405 |
| 2023/0014099 | A1* | 1/2023 | Minamikawa | B41J 29/42 |
| 2023/0016418 | A1* | 1/2023 | Hotta | H04N 1/00352 |

FOREIGN PATENT DOCUMENTS

| | | |
|---|---|---|
| JP | 2019155849 A | 9/2019 |
| JP | 2019160162 A | 9/2019 |

OTHER PUBLICATIONS

International Search Report dated Jun. 8, 2021 issued in PCT/JP2021/010552.
Notice of Reasons for Refusal dated May 17, 2024 received in Japanese Patent Application No. JP 2020-064940.

\* cited by examiner

PRINTING SYSTEM EXECUTING TWO OR MORE TARGET JOBS IN RESPONSE TO COMPLETION OF SETTLEMENT OF TOTAL FEE

REFERENCE TO RELATED APPLICATIONS

This application is a by-pass continuation application of International Application No. PCT/JP2021/010552 filed Mar. 16, 2021 claiming priority from Japanese Patent Application No. 2020-064940 filed Mar. 31, 2020. The entire contents of the international application and the priority application are incorporated herein by reference.

BACKGROUND ART

In a conventional document printing system, print data is stored on a multifunction peripheral (MFP). When a user selects print data, the MFP sends the print data to a computer for calculating the fee required for the print data. Once the fee has been settled, the MFP prints the data.

DESCRIPTION

However, the conventional document printing system described above has not been user-friendly for cases in which the user wishes to print a plurality of sets of print data accumulated on the MFP. In a case that the plurality of sets of print data is to be printed, the user must perform payment operations, such as scanning a two-dimensional code, sending a user ID, and entering a bank account password, for each set of print data.

In view of the foregoing, it is an object of the present disclosure to provide a printing system, a printing device, and a printing program that can improve user-friendliness by only requiring the user to perform the payment operations once when executing a plurality of print jobs accumulated on an MFP.

In order to attain the above and other object, the present disclosure provides a printing system. The printing system includes a printing mechanism. The printing mechanism is configured to perform printing. The printing system is configured to perform: storing a plurality of print jobs in a storage; receiving selections of two or more print jobs to be executed as two or more target jobs from among the plurality of print jobs stored in the storage; determining a total fee to be charged for executing the two or more target jobs; a settlement related process related to settlement of the determined total fee; and executing the two or more target jobs to print images by using the printing mechanism in response to completion of settlement of the total fee.

According to another aspect, the disclosure provides a printing device. The printing device includes a printing mechanism, an operation interface, and a controller. The printing mechanism is configured to perform printing. The controller is configured to perform: transmitting a print job to a data processing server; receiving via the operation interface selections of two or more print jobs to be executed as two or more target jobs from among a plurality of print jobs stored in a storage managed by the data processing server; and executing the two or more target jobs to print images by using the printing mechanism in response to completion of settlement a total fee, the total fee being charged for executing the two or more target jobs.

According to another aspect, the disclosure provides a printing method. The printing method includes: storing a plurality of print jobs; receiving selections of two or more print jobs to be executed as two or more target jobs from among the plurality of stored print jobs; determining a total fee to be charged for executing the two or more target jobs; performing a settlement related process related to settlement of the determined total fee; and executing the two or more target jobs to print images in response to completion of settlement of the total fee.

According to another aspect, the disclosure provides a non-transitory computer readable storage medium storing a set of program instructions executed by a computer included in a printing device. The printer further includes a printing mechanism configured to perform printing and an operation interface. The set of program instructions includes: transmitting a print job to a data processing server; receiving via the operation interface selections of two or more print jobs to be executed as two or more target jobs from among a plurality of print jobs stored in a storage managed by the data processing server; and executing the two or more target jobs to print images by using the printing mechanism in response to completion of settlement of a total fee, the total fee being charged for executing the two or more target jobs.

With the above structures, payment operations can be collectively performed for executing two or more selected print jobs, thereby improving user-friendliness.

FIG. 1 shows a printing system according to a present embodiment. In the present embodiment, a printing system 1 provides a print service to users, i.e., customers who pay a fee to use the printing function of a multifunction peripheral 200.

OVERVIEW OF THE PRINTING SYSTEM

Figure 1:
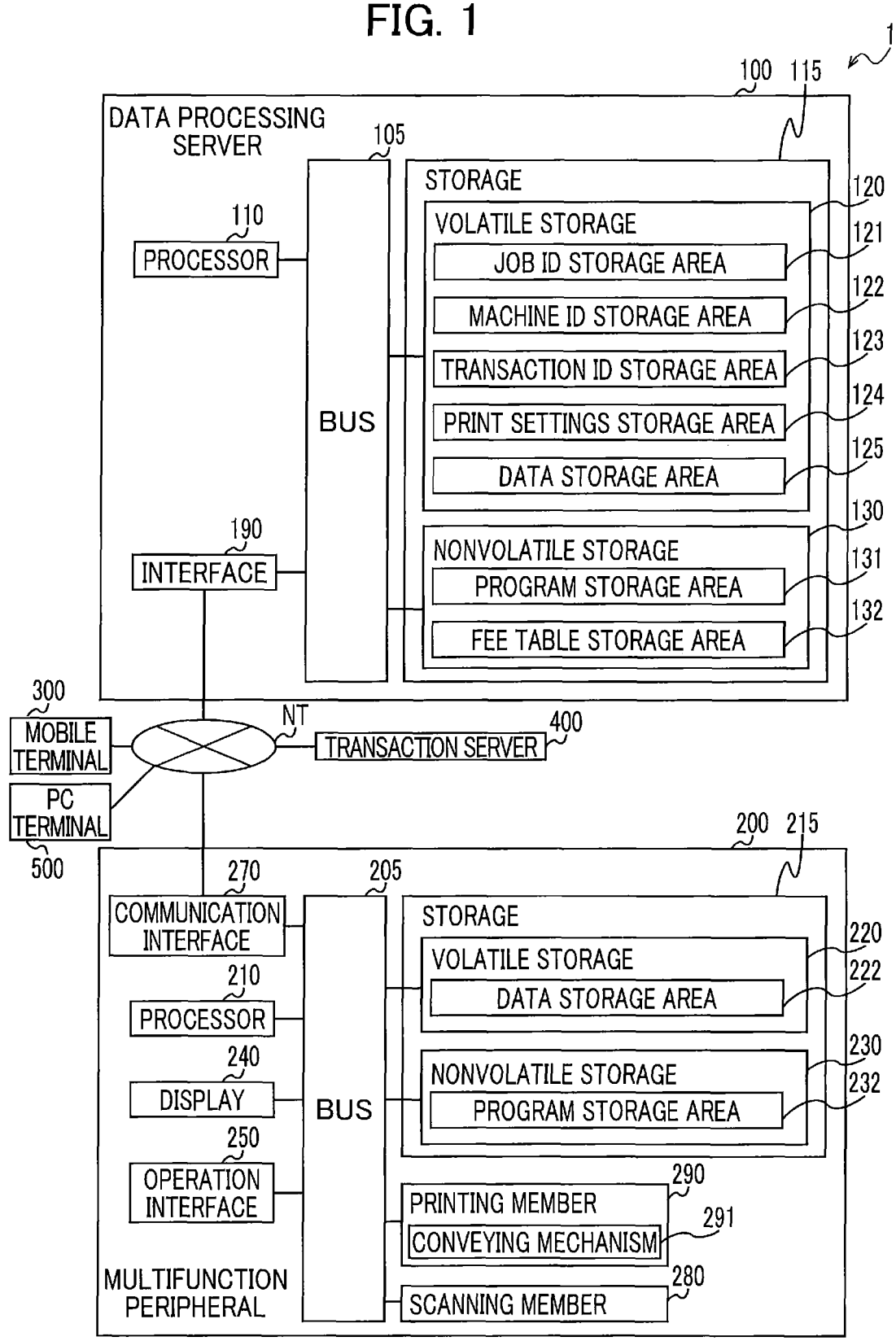
FIG. 1 is a block diagram illustrating an overview of functional structures of a printing system according to an embodiment.

The printing system 1 in FIG. 1 includes a data processing server 100, a multifunction peripheral 200, a mobile terminal 300, and a transaction server 400. A personal computer terminal (PC) 500 is provided to be communicable with the printing system 1. The PC is an example of the external device. The data processing server 100, the multifunction peripheral 200, the mobile terminal 300, the transaction server 400, and the PC terminal 500 are interconnected over a network NT and are capable of communicating with each other.

Data Processing Server

The data processing server 100 is installed and managed by the manufacturer of the multifunction peripheral 200, for example. The data processing server 100 has a processor 110, a storage 115, and an interface 190. The processor 110, the storage 115, and the interface 190 are interconnected via a bus 105.

The storage 115 is provided with a volatile storage 120, and a nonvolatile storage 130. The volatile storage 120 is DRAM, for example, and has a job ID storage area 121, a machine ID storage area 122, a transaction ID storage area 123, a print settings storage area 124, and a data storage area 125. The nonvolatile storage 130 is a hard disk drive or a solid state drive, for example. The nonvolatile storage 130 has a program storage area 131, and a fee table storage area 132. The details of these storages will be described later in detail.

The processor 110 is a device that performs data processing, such as a CPU. By executing a program stored in the program storage area 131, the processor 110 implements various processes, such as those in FIGS. 2, 9, 12 and the like described later, including processes for performing data communications with the mobile terminal 300, the multifunction peripheral 200, the transaction server 400, and the PC terminal 500 connected to the network NT.

The interface 190 is a wired LAN interface or a wireless interface for communicating with other devices. The interface 190 is connected to the network NT.

Transaction Server

The transaction server 400 is installed at a company providing various online services for settling online payments, for example. Although not shown in the drawings, the transaction server 400 has a processor, a storage, and an interface for connecting to the network NT.

Multifunction Peripheral

The multifunction peripheral 200 is owned by the company providing the print service described above, for example. The multifunction peripheral 200 is an example of the printing device. The multifunction peripheral 200 has a scanning member 280, a printing member 290, a processor 210, a storage 215, a display 240, a user-operable operation interface 250, and a communication interface 270. The scanning member 280 is an example of a scanner, and the processor 210 is an example of the controller. The scanning member 280, the printing member 290, the processor 210, the storage 215, the display 240, the operation interface 250, and the communication interface 270 are interconnected via a bus 205.

The storage 215 includes a volatile storage 220 and a nonvolatile storage 230. The volatile storage 220 is DRAM, for example. The volatile storage 220 is provided with a data storage area 222 for storing image data. The nonvolatile storage 230 is flash memory, for example. The nonvolatile storage 230 is provided with a program storage area 232. Among the various programs stored in the program storage area 232, a printing program of the present embodiment that pertains to the execution of processes in FIGS. 2, 9, 12, and the like described later is prestored in the nonvolatile storage 230 as firmware, for example.

The processor 210 is a device such as a CPU that performs data processing. By executing the printing program stored in the program storage area 232, the processor 210 implements a printing method according to the printing system 1 of the present embodiment in cooperation with the processor 110 of the data processing server 100. Through this execution, the processor 210 can control the printing member 290 to print images based on image data received from the PC 500. The processor 210 can implement a copy function to control the printing member 290 to print an image according to scan data which is obtained by reading an original using the scanning member 290 as described in a variation (3) below.

The display 240 is a liquid crystal display, for example. The operation interface 250 is a device that receives user operations. By operating the operation interface 250, the user can input various instructions into the multifunction peripheral 200. The communication interface 270 is a wired or wireless network interface for communicating with other devices. The communication interface 270 is connected to the network NT.

The scanning member 280 optically reads a document or other scanning target using photoelectric conversion elements, such as a CCD or CMOS, and generates image data or scan data representing an image of the scanning target.

The printing member 290 has a conveying mechanism 291 for picking up and conveying sheets of paper from a sheet-feeding tray and prints images on the conveyed sheets according to a prescribed method. The following specification describes a case in which printing is performed according to the inkjet method. The paper is an example of the print media.

Mobile Terminal

The mobile terminal 300 is a smartphone or other mobile terminal owned by the user in this example. The mobile terminal 300 connects to the network NT through wireless communication, for example. While not shown in the drawings, the mobile terminal 300 has a processor, a storage, and an interface for connecting to the network NT. Another information terminal such as a personal computer or a tablet computer may be used in place of the mobile terminal 300.

PC

The PC 500 is installed in the user's home or office in this example and is connected to the network NT via wired or wireless communication. While not shown in the drawings, the PC 500 has a processor, a storage, and an interface for connecting to the network NT.

Features of the Embodiment

A feature of the present embodiment is a one-time settlement (or, collective settlement) process performed on the printing system 1 having the above configuration in order to pay the charges (fees) for multiple print jobs altogether (or, in one lump sum) when the user has selected a plurality of print jobs to be printed on the multifunction peripheral 200 from among print jobs previously transmitted from the PC 500 and stored on the data processing server 100.

Process Flow

Figure 12:
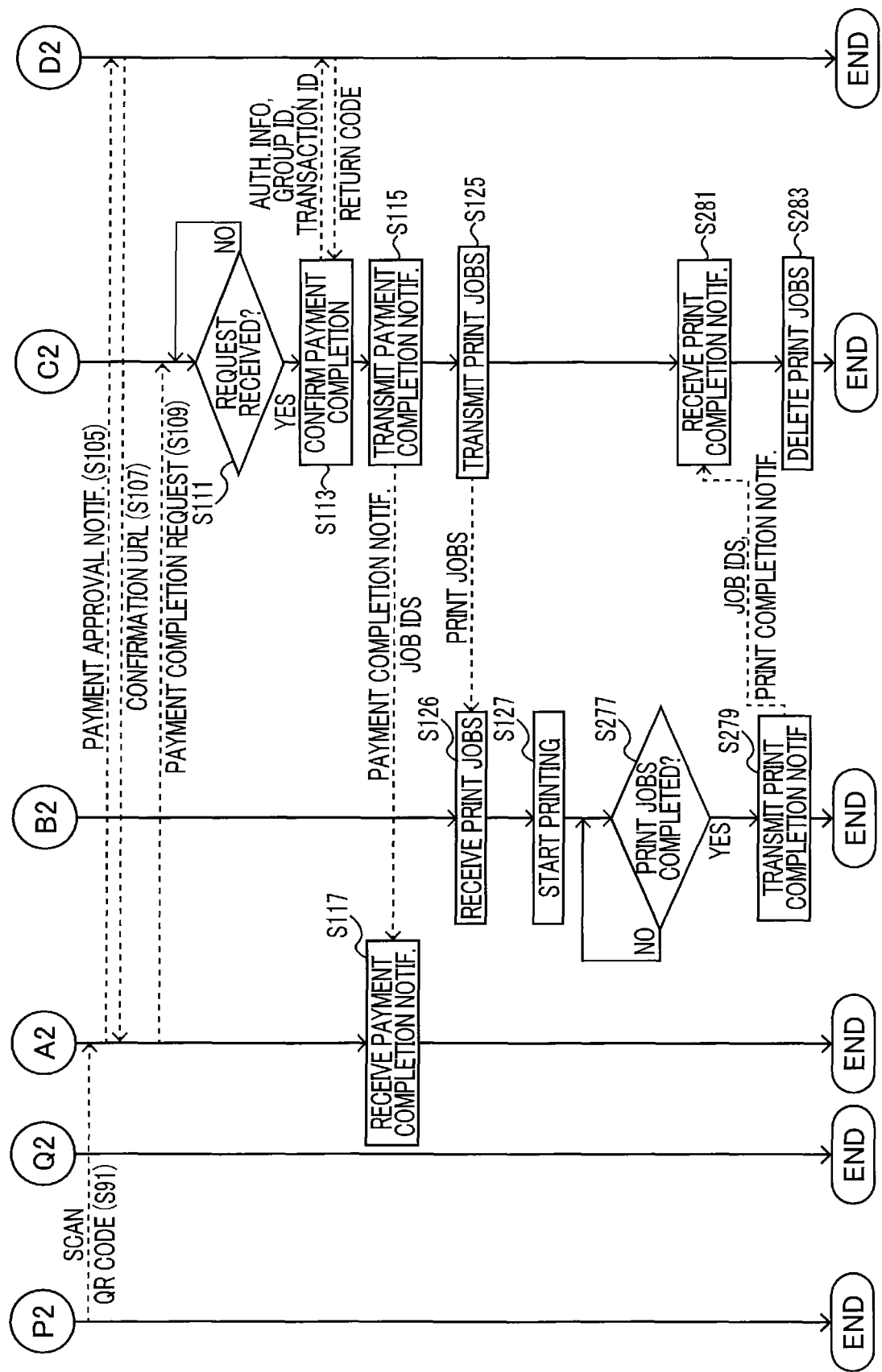
FIG. 12 is a sequence chart illustrating a successive process of the process of FIG. 9.

Control procedures executed by the processor 210 of the multifunction peripheral 200, the processor 110 of the data processing server 100, the processor of the transaction server 400, the processor of the mobile terminal 300, and the processor of the PC 500 will be described with reference to FIGS. 2, 9, and 12. Note that references to these processors have been omitted in the following description of FIGS. 2, 9, and 12. That is, expressions such as "the processor of the multifunction peripheral 200" and "by the processor of the multifunction peripheral 200" are simply expressed as "the multifunction peripheral 200" and "by the multifunction peripheral 200."

Sending/Receiving a Print Job

Figure 2:
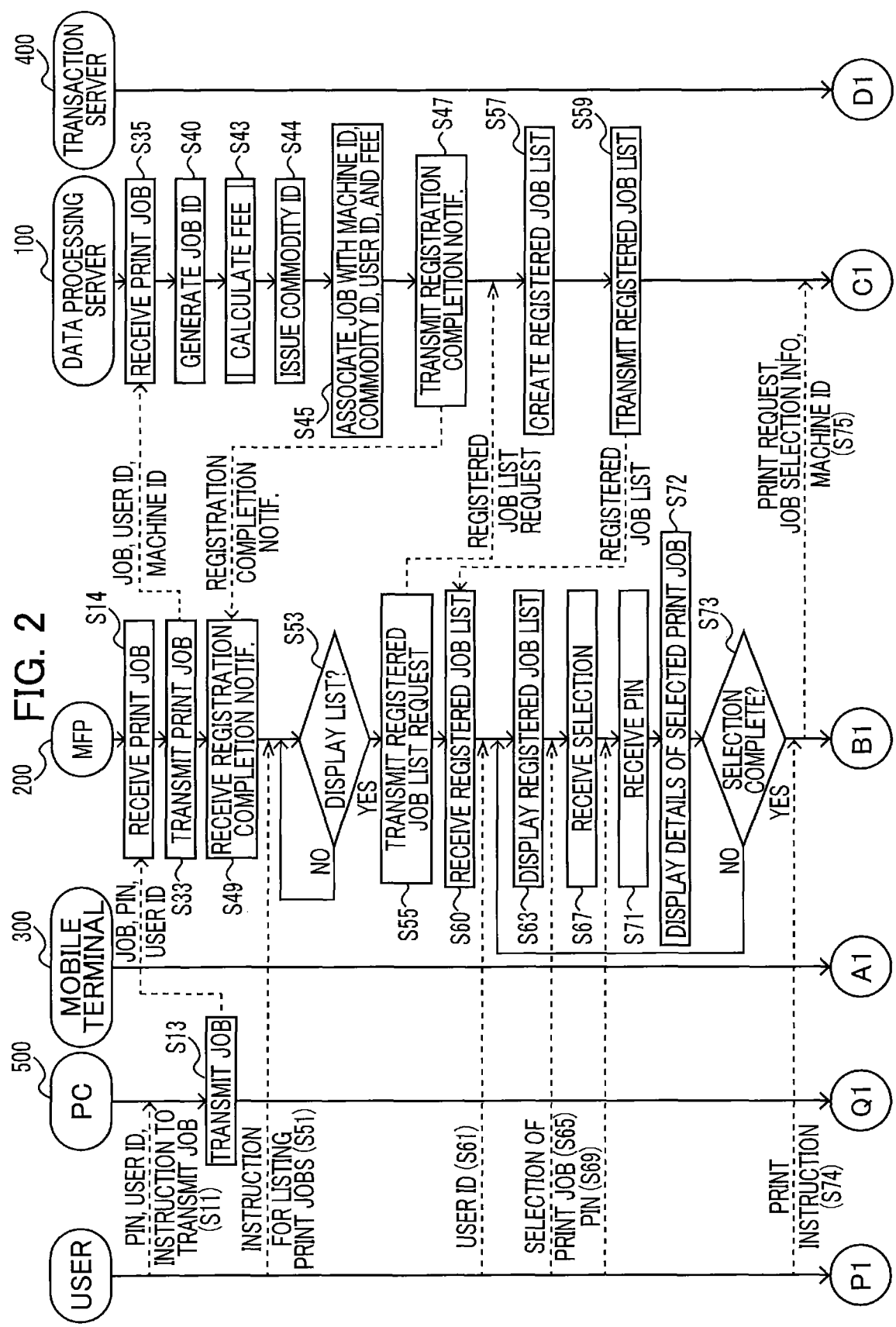
FIG. 2 is a sequence chart illustrating a process executed by a PC, a mobile terminal, a multifunctional peripheral, a data processing server, and a transaction server.

In S11 of FIG. 2, the user first performs operations on an operation interface of the PC 500 for instructing the PC 500 to transmit a print job including image data that the user has prepared for printing. At the same time, the user operates the PC 500 to input a personal user ID, and a PIN code, and print settings. The PIN code is for ensuring the security of the print job into the PC 500. These operations can be performed via a printer driver or application installed on the PC 500, for example. In this specification, the print job includes print data such as the aforementioned image data to be printed, and a print command for commanding the multifunction peripheral 200 to print this print data. Hereinafter, the action of printing print data included in a print job on print media may be simply referred to as "executing a print job" or "printing a print job".

In response to the user operations in S11, in S13 the PC 500 transmits this print job, the user ID, and the PIN code to the multifunction peripheral 200, and in S14 the multifunction peripheral 200 receives the print job and the like. The process of S14 is an example of the print job receiving step.

In S33 the multifunction peripheral 200 sends to the data processing server 100 the print job received in S14 together with the machine ID, and the user ID and the print settings which were also received in S14. The machine ID is an example of the identification information for the multifunction peripheral 200. The process of S33 is an example of the print job transmitting step and process.

In S35 the data processing server 100 receives the print job, the machine ID, the user ID, and the print settings that were transmitted from the multifunction peripheral 200 in S33. Subsequently in S40, the data processing server 100 generates a job ID. The job ID is information for identifying the print job to be executed on the multifunction peripheral 200, i.e., for identifying the image data. The print job, the machine ID, and the user ID received in S35 and the job ID generated in S40 are stored in the image data storage area 125 in S45 described later so that the print job, the machine ID, and the user ID are in association with the job ID.

In S43 the data processing server 100 calculates the fee to be charged to the user for executing the print job received in S35, i.e., for printing all the image data included in this print job. The function of the processor 110 executing the process of S43 is an example of the first fee determining member. To calculate this fee, the data processing server 100 uses a prescribed fee table stored in the fee table storage area 132 of the volatile storage 120, for example. In this calculation, the data processing server 100 also takes into account the values of print settings that were transmitted from the PC 500 together with the print job and stored in the print settings storage area 124 of the data processing server 100.

Subsequently, in S44 the data processing server 100 issues a commodity ID for the service of printing the print job received in S35. Hence, an individual commodity ID is generated for each print job.

Next, in S45 the data processing server 100 associates the above print job with the corresponding machine ID received in S35, and the commodity ID generated in S44, and the print settings, and registers this data. Specifically, the print job, the job ID, the machine ID, the print settings are stored in the respective data storage area 125, the job ID storage area 121, the machine ID storage area 122, and the print settings storage area 124 so that the print job, the job ID, the machine ID, and the print settings are in association with each other. In S45 the fee calculated in S43 may be also stored in association with the print job, the job ID, and the machine ID. Note that this print job, the job ID, and the machine ID are also stored in association with the user ID received in S35 at this time.

In S47 the data processing server 100 transmits a registration completion notification to the multifunction peripheral 200 indicating that the registration was completed in S45, and the multifunction peripheral 200 receives this notification in S49.

The process in S11-S49 described above is executed each time a print job is transmitted from the PC 500 in S11. Each time the data processing server 100 receives a print job in S35, the print job is sequentially stored and accumulated in the data storage area 125. The data storage area 125 is an example of the data accumulating member and the process of S35 is an example of the job accumulating step.

After completing the process in S49 described above, in S53 the multifunction peripheral 200 waits (S53: NO) until an instruction to display a registered job list described later has been received. While a plurality of print jobs is stored in the data storage area 125, in S51 the user operates the operation interface 250 of the multifunction peripheral 200 appropriately to issue an instruction for listing the print jobs registered on the data processing server 100. As a result, the multifunction peripheral 200 receives this display instruction (S53: YES) and in S55 transmits a request for a registered job list to the data processing server 100.

In response to receiving the request for the registered job list, in S57 the data processing server 100 creates a registered job list listing the plurality of registered print jobs that was stored in the data storage area 125 as described above, based on the machine ID for the MFP that issued the request. The registered job list may include additional information on the user ID associated with each print job therein.

In S59 the data processing server 100 transmits the registered job list created in S57 to the multifunction peripheral 200, and the multifunction peripheral 200 receives this list in S60.

Figure 3:
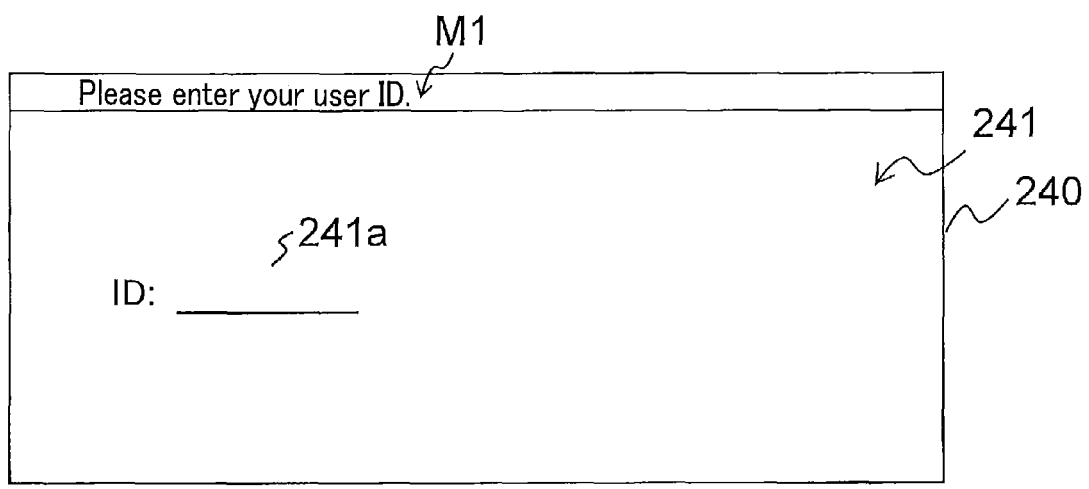
FIG. 3 is an explanatory diagram illustrating a user ID entry screen displayed on the display of the multifunction peripheral.

In response to the registered job list received in S60 after the multifunction peripheral 200 received the instruction to display the list of print jobs described above, the multifunction peripheral 200 displays a user ID entry screen 241 shown in FIG. 3 on the display 240. The user ID entry screen 241 includes a message M1, and a user ID field 241*a*. The message M1 is "Please enter your user ID." While the user ID entry screen 241 is displayed on the display 240, in S61 the user performs appropriate operations on the operation interface 250 to input the user's own user ID in the user ID field 241*a*, and the multifunction peripheral 200 receives these operations.

In S63 the multifunction peripheral 200 displays the registered job list on the display 240. Here, the displayed registered job list includes only those print jobs registered on the data processing server 100 that correspond to the user ID.

Hereinafter, the expression "the user inputs data in the entry field displayed on the display 240 through operations on the operation interface 250" will simply be referred to as "the user inputs data into the entry field of the display 240" or the like as appropriate. Similarly, the expression "the user performs an operation or selection or specification or the like of a button or key in a display or the like displayed on the display 240 via the operation interface 250" will simply be referred to as "the user operates or presses a button or key on the display 240" or "the user selects content corresponding to a displayed name".

Note that when the multifunction peripheral 200 receives a registered job list from the data processing server 100 in S60 that pertains to all users of the multifunction peripheral 200, the multifunction peripheral 200 may extract and display only those jobs in the list that correspond to the user ID inputted in S61. Alternatively, the data processing server 100 may not create and transmit the registered job list until the user ID has been inputted in S61. In this case, once the user ID has been inputted, the multifunction peripheral 200 transmits the machine ID and the user ID to the data processing server 100, the data processing server 100 creates a registered job list corresponding to the machine ID and the user ID and transmits the generated job list to the multifunction peripheral 200, and the multifunction peripheral 200 receives this list. Further, when security of the registered job list is not an issue, the process of S61 for entering a user ID in S61 may be omitted, and in S63 the multifunction peripheral 200 may display the registered job list received in S60 for all users on the display 240.

Figure 4:
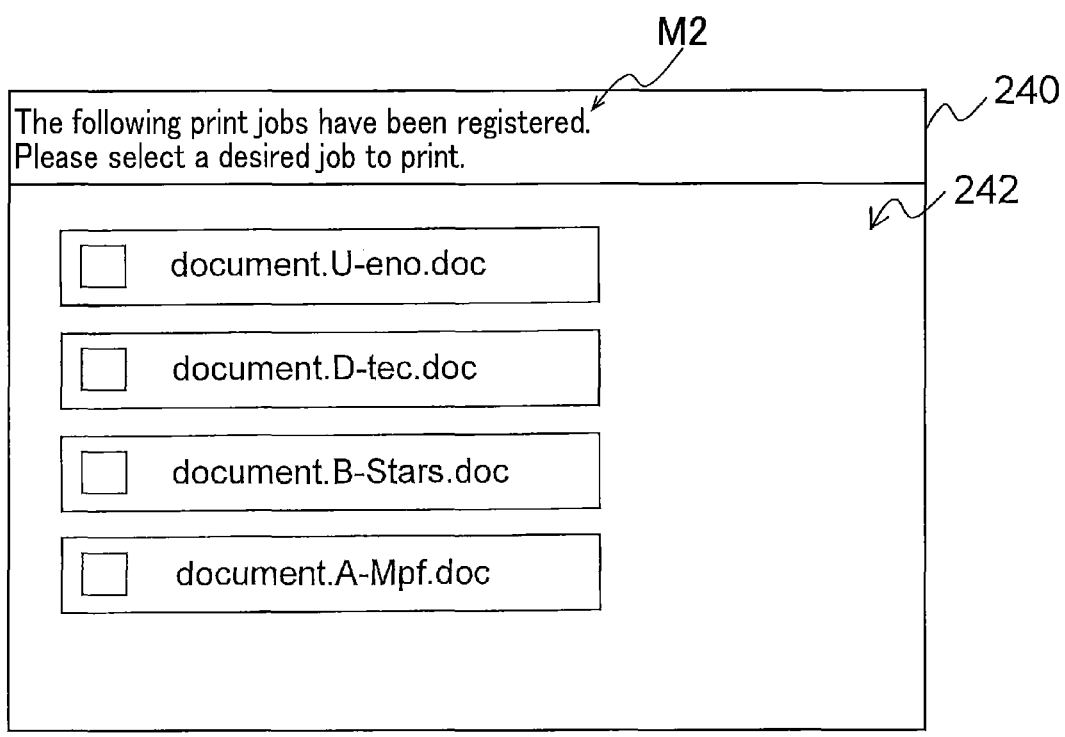
FIG. 4 is an explanatory diagram illustrating a registered job list display screen displayed on the display of the multifunction peripheral.

FIG. 4 shows an example of a registered job list displayed on the display 240, as described above. In FIG. 4, a registered job list display screen 242 is displayed on the display 240. The registered job list display screen 242 includes a message M2, and identification information for each print job associated with the user ID. In this example, the message M2 is "The following print jobs have been registered. Please select a desired job to print." Further, the identification information in this example is a list of filenames for the print jobs. The identification information for print jobs is an example of the print job related information. In the example of FIG. 4, four print jobs having the filenames "document.U-eno.doc", "document.D-tec.doc", "document.B-stars.doc", and "document.A-Mpf doc" are displayed as selectable candidates for printing.

While the registered job list display screen 242 is displayed on the display 240, in S65 the user selects (designates) a desired print job by entering a checkmark in the checkbox next to the filename of the job, and in S67 the multifunction peripheral 200 receives this selection (or designation). Although only one print job can be selected by the user in S65, the user can repeat this selection as described below, resulting in the selection of a plurality of print jobs.

Figure 5:
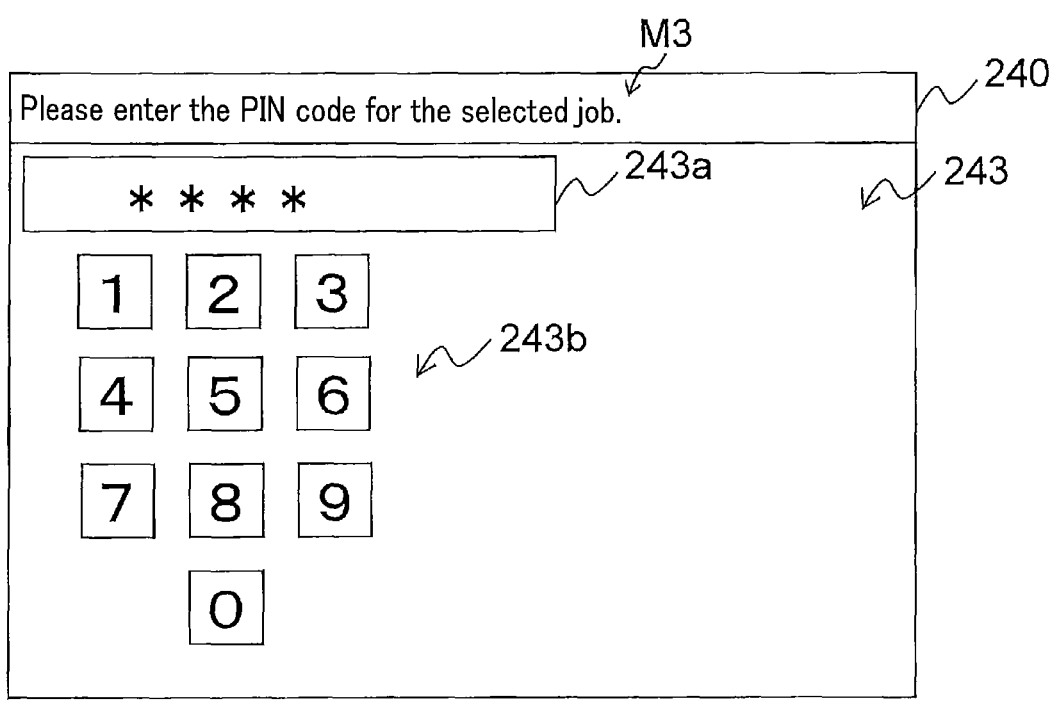
FIG. 5 is an explanatory diagram illustrating a PIN code entry screen displayed on the display of the multifunction peripheral.

When the user selects one of the print jobs described above, the multifunction peripheral 200 displays a PIN code entry screen 243 shown in FIG. 5 on the display 240. The PIN code entry screen 243 includes a message M3, a PIN code field 243*a*, and a numeric keypad 243*b*. The message M3 is "Please enter the PIN code for the selected job." In S69 the user inputs the PIN code for the selected job into the PIN code field 243*a* of the PIN code entry screen 243, and specifically re-inputs the PIN code that was originally inputted in S11 when the print job specified in S65 was transmitted to the multifunction peripheral 200. In S71 the multifunction peripheral 200 receives the inputted PIN code and in S72 sets (decides) this print job as the selected print job and displays details of the file information for the selected print job on the display 240. The processes of S71 and S67 are an example of the selection reception step and process. The function that performs the process of S71 and S67 is an example of the selection reception member.

Figure 6:
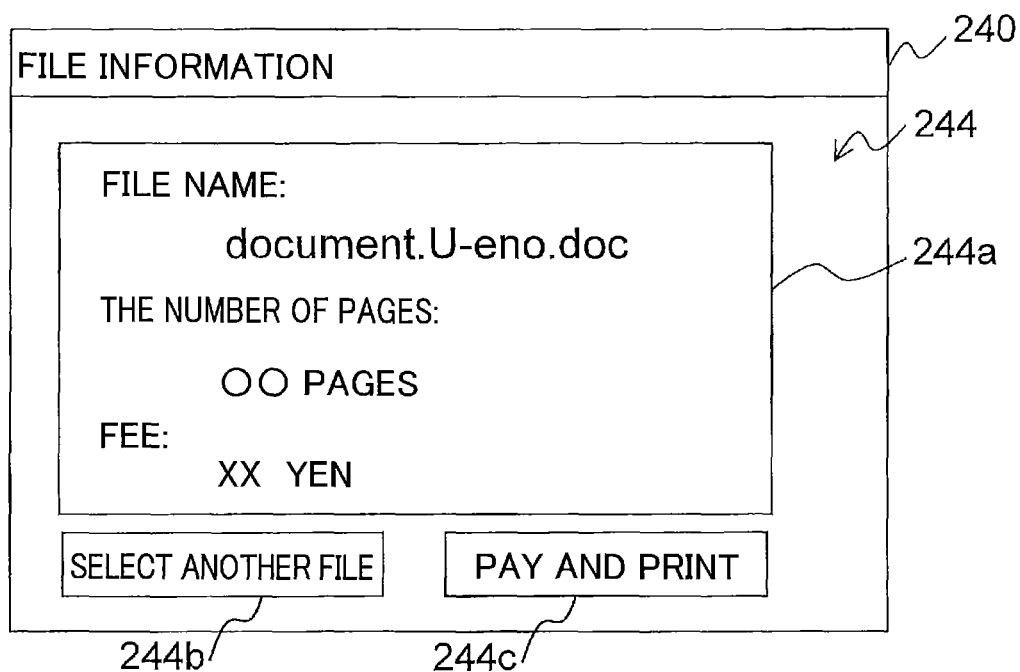
FIG. 6 is an explanatory diagram illustrating a file information display screen displayed on the display of the multifunction peripheral.

FIG. 6 shows an example of file information for a print job that is displayed on the display 240, as described above. As shown in FIG. 6, a file information display screen 244 is displayed on the display 240. This example shows the case in which the print job having the filename "document.U-eno.doc" was selected. As shown in FIG. 6, the file information display screen 244 includes a file information field 244*a*, a "Select Another File" button 244*b*, and a "Pay and Print" button 244*c*.

The file information displayed in the file information field 244*a* of this example is the filename "document.U-eno.doc", the number of pages in the file for the print job, and the fee charged for executing the print job. The multifunction peripheral 200 may acquire this fee from information on the amount calculated in S43 and included in the job list transmitted from the data processing server 100, or the processor 210 of the multifunction peripheral 200 may independently calculate the fee according to the same method described in S43. The fee for each print job may also be displayed together with the filename for the corresponding print job in the registered job list shown in FIG. 4.

After displaying details of the selected print job in S72, in S73 the multifunction peripheral 200 determines whether the user is done selecting print jobs. When the user operates the "Select Another File" button 244*b* (S73: NO), the multifunction peripheral 200 returns to S63. In this case, in S63 the multifunction peripheral 200 displays the registered job list display screen 242 with one or more checkboxes having checkmarks that the user has already been selected. The user selects again another print job in S65 through the registered job list display screen 242, and the multifunction peripheral 200 repeats the process described above in S67-S72 after. Repeatedly performing this process in S67-S72 enables the user to select a plurality of print jobs.

After the user operates the "Pay and Print" button 244*c*, indicating that the user has finished selecting jobs (S73: YES), the remaining processes are performed based on the confirmed selections made and displayed most recently in S72.

Figure 7:
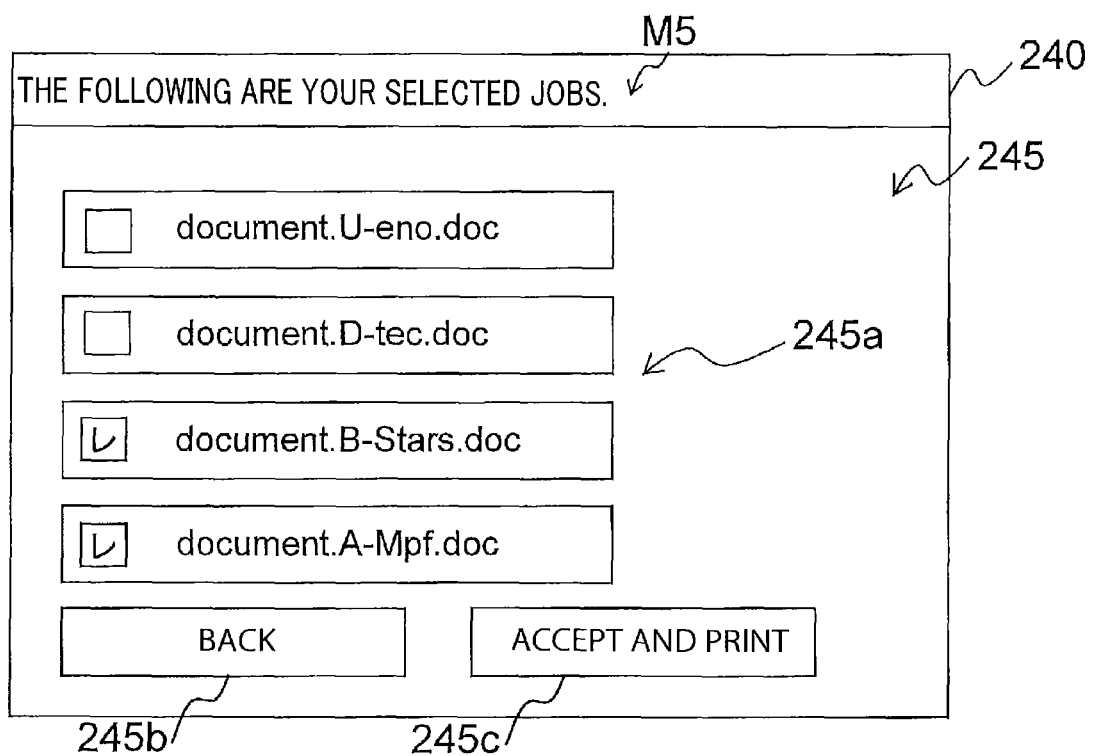
FIG. 7 is an explanatory diagram illustrating a selected jobs confirmation screen displayed on the display of the multifunction peripheral.

Specifically, when the user operates the "Pay and Print" button 244*c*, the multifunction peripheral 200 displays a selected jobs confirmation screen 245 shown in FIG. 7 on the display 240. As shown in FIG. 7, this selected jobs confirmation screen 245 includes a message M5, a selected jobs fields 245*a*, a "Back" button 245*b*, and an "Accept and Print" button 245*c*. The message M5 is "The following are your selected jobs." In this example, the two print jobs having filenames "document.B-stars.doc" and "document.A-Mpf.doc" have been selected in the selected jobs fields 245a.

Figure 8:
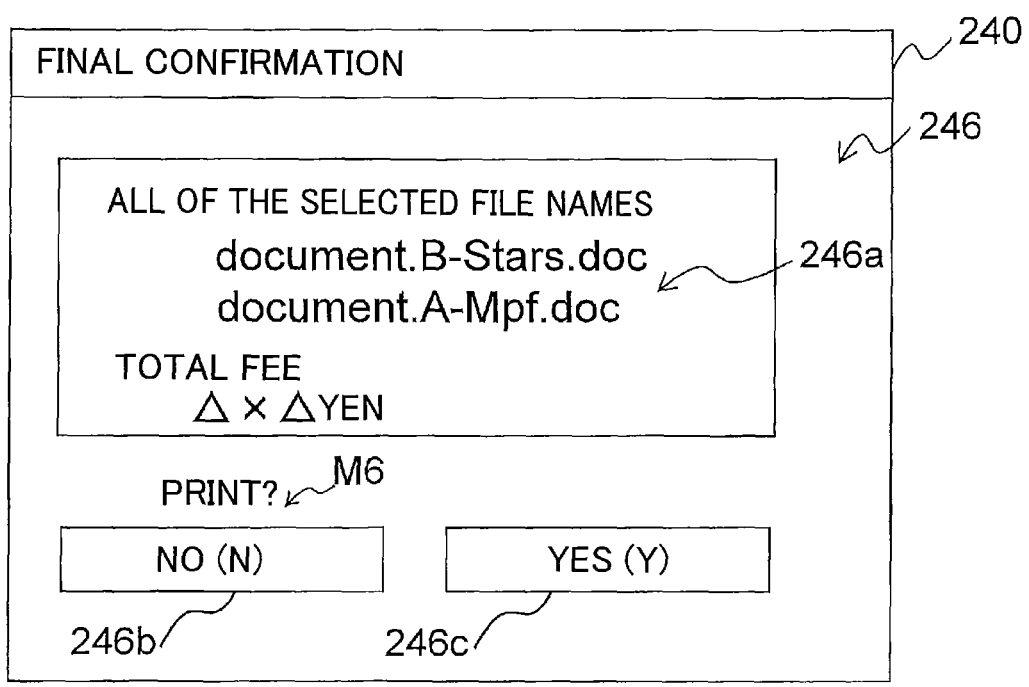
FIG. 8 is an explanatory diagram illustrating a final confirmation screen displayed on the display of the multifunction peripheral.

When the user operates the "Accept and Print" button 245c, the operation interface 250 displays a final confirmation screen 246 shown in FIG. 8 on the display 240. The final confirmation screen 246 includes a fee confirmation field 246a, a "Print?" message M6, a "No" button 246b, and a "Yes" button 246c. Based on the example shown in FIG. 7, the two selected filenames "document.B-stars.doc" and "document.A-Mpf.doc" and the total fee for printing these jobs are displayed in the fee confirmation field 246a. This total fee is the sum of the fees respectively displayed in the file information display screen 244 for executing each of the print job "document.B-stars.doc" and the print job "document.A-Mpf.doc".

In S74 the user issues a final print instruction to the multifunction peripheral 200 by operating the "Yes" button 246c in the final confirmation screen 246. As a result of this operation, in S75 the multifunction peripheral 200 transmits a print request corresponding to this print instruction to the data processing server 100 together with the results of the selected print jobs as the job selection information and the machine ID for the multifunction peripheral 200. The print request is an example of the first total fee decision instruction.

Figure 9:
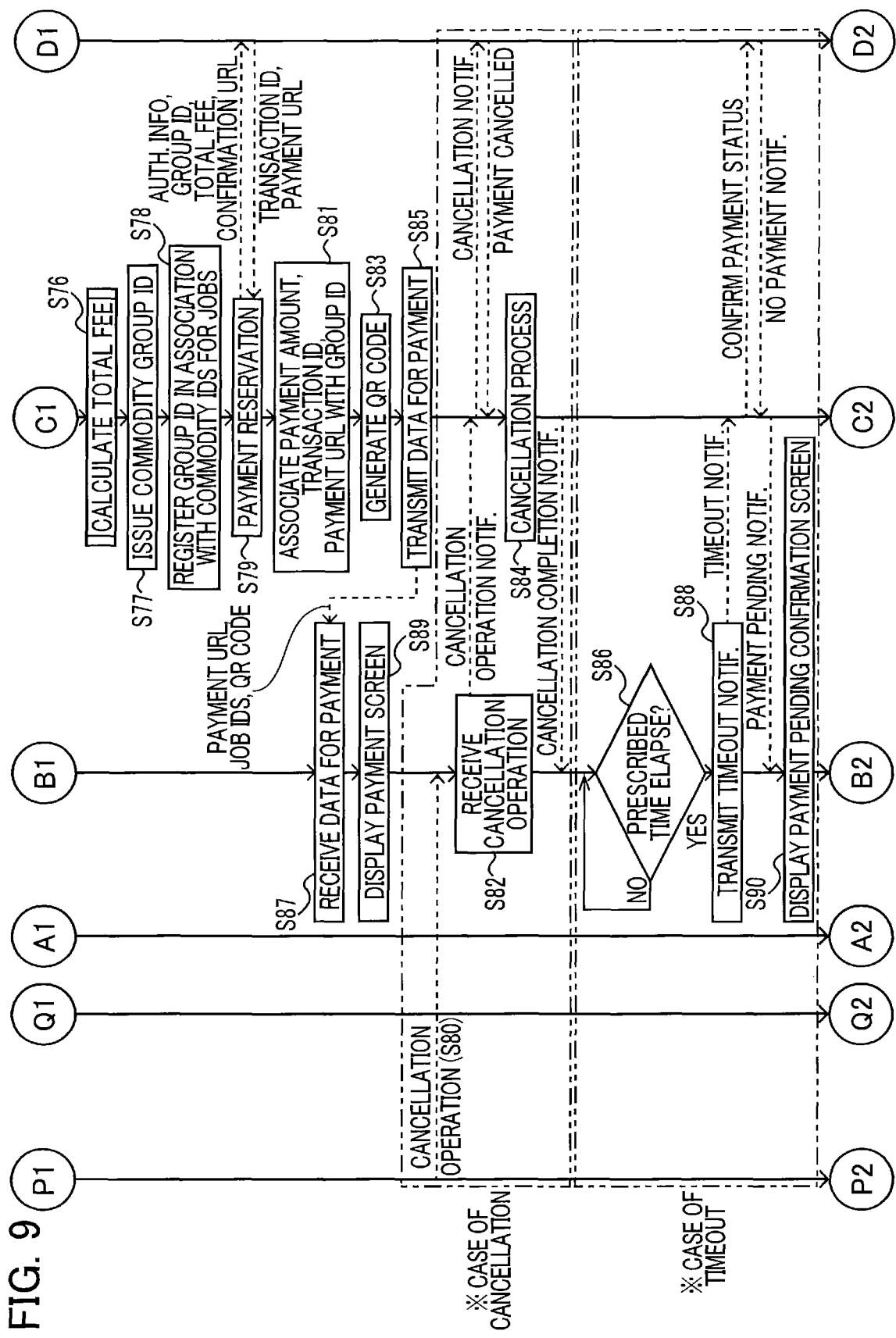
FIG. 9 is a sequence chart illustrating a successive process of the process of FIG. 2.

Continuing in FIG. 9, in response to the print request received in S75, in S76 the data processing server 100 calculates the total fee amount to be charged to the user for printing all the selected print jobs, i.e., the total fee for the current printing service based on selections of all the print jobs received in S75. In other words, the data processing server 100 calculates the sum of the fees for all the print jobs each decided in S43. As in S43 described above, the data processing server 100 calculates the total fee based on a prescribed fee table, for example. At this time, the data processing server 100 may provide some benefit to the user, such as a discount on the above total fee amount, the issuance of a discount ticket or coupon that can be used separately from this transaction, a separate granting of points or miles, or some other preferential right according to the type of each selected print job, the number of pages included in each print job, and the like. The function of the processor 110 performing the process of S76 is an example of the first total fee calculating member. The processes of S76 and S43 are examples of the total fee decision step.

Subsequently, in S77 the data processing server 100 issues a commodity group ID for paying in one lump sum the total charges for all print jobs selected as described above. Hereinafter, payment of a fee will simply be referred to as "settlement" in this specification as appropriate. In other words, the commodity group ID is an ID newly assigned to a single group of commodity IDs, each associated with one of a plurality of print jobs selected by the user as described above. The commodity group ID is an example of the group identification information. The function of the processor 110 performing the process of S77 is an example of the identification information generation member.

Subsequently in S78, the data processing server 100 registers this commodity group ID in association with the commodity IDs issued in S44 for the above-selected print jobs. Note that the job ID described above may be used in place of the commodity ID at this time. The commodity ID and the job ID are examples of the job identification information.

In S79 the data processing server 100 performs a payment reservation process. Specifically, the data processing server 100 transmits one commodity group ID associated with the selected print jobs, the total payment amount for the user resulting from the calculation in S76, authentication information used for authentication on the transaction server 400, and a confirmation URL for confirming when payment is complete (a URL for the data processing server 100 in the present embodiment) to the transaction server 400.

As a result of this transmission, the data processing server 100 receives the payment URL that the user can access to pay the fee, and the transaction ID related to this fee payment procedure from the transaction server 400.

In S81 the data processing server 100 associates the total payment amount resulting from the calculation in S76 and the transaction ID and the payment URL acquired in S79 with the commodity group ID described above. The processes of S79 and S81 are an example of the settlement related process. The function of the processor 110 executing the processes of S79 and S81 is an example of the settlement related processing member. In S83 the data processing server 100 generates a barcode, such as a QR code (registered trademark), corresponding to the payment URL according to a suitable well-known method and in S85 transmits data required for payment that includes this QR code to the multifunction peripheral 200. "QR code" is a registered Japanese trademark of DENSO WAVE INCORPORATED.

In S87 the multifunction peripheral 200 receives this data required for payment, which includes the payment URL and the job IDs in addition to the QR code (registered trademark). After receiving this data, in S89 the multifunction peripheral 200 displays a prescribed payment screen on the display 240 showing information including at least this QR code based on the data required for payment.

Figure 10:
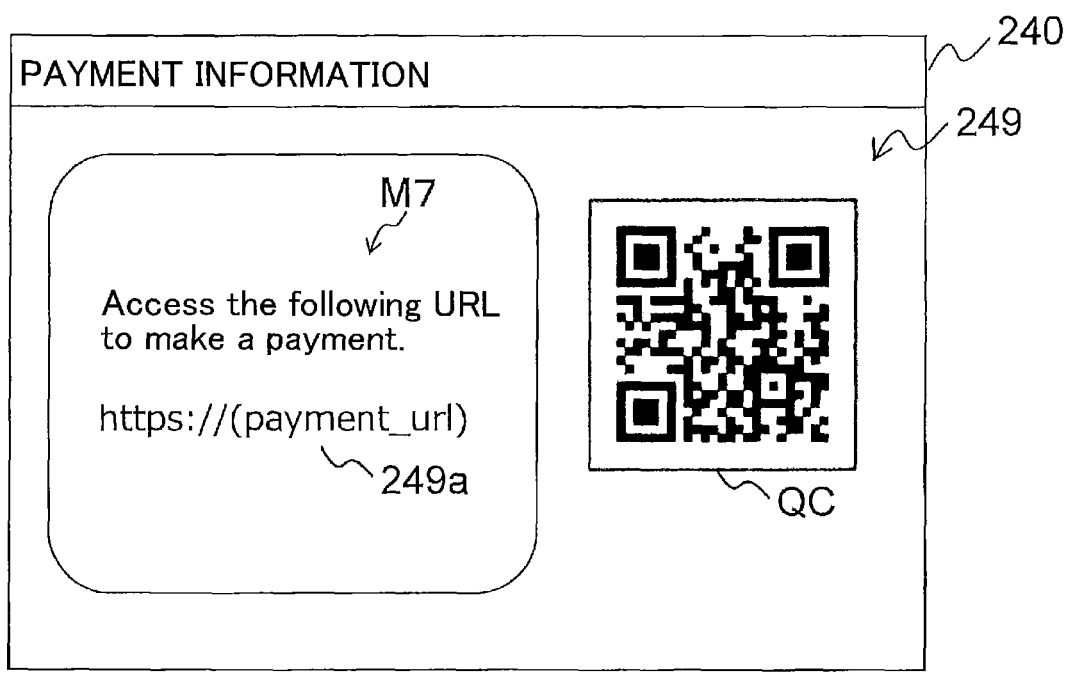
FIG. 10 is an explanatory diagram illustrating a payment screen displayed on the display of the multifunction peripheral.

FIG. 10 shows an example of a payment screen 249. The payment screen 249 shown in FIG. 10 includes a QR code QC, a message M7, and a URL field 249a displaying a URL that the user can access to pay the fee. The message M7 is "Access the following URL to make a payment." Note that rather than outputting the data required for payment to be displayed, the multifunction peripheral 200 may output the data to be printed by the printing member 290. In other words, images of the data may be formed on paper.

In a case that the user has a change of mind after viewing the payment screen 249 displayed as described above, in S80 the user may perform a prescribed cancellation operation on the operation interface 250 in order to cancel the printing service. In S82 this operation is received by the multifunction peripheral 200, and the multifunction peripheral 200 transmits a notification of the cancellation operation to the data processing server 100. Upon receiving this notification, the data processing server 100 also transmits a cancellation notification to the transaction server 400 and subsequently receives a notification from the transaction server 400 indicating that the current payment prepared in S79 has been canceled. Upon receiving this notification from the transaction server 400, in S84 the data processing server 100 executes a prescribed cancellation process and, after completing the cancellation process, transmits a cancellation completion notification to the multifunction peripheral 200. As a result, the multifunction peripheral 200 displays a message on the display 240 indicating that the jobs have been canceled.

On the other hand, in a case that the user has not performed a cancellation operation, in S86 the multifunction peripheral 200 continually determines whether a prescribed time has elapsed (S86: NO). When the prescribed time elapses without the user performing any operations in the payment screen 249 displayed as described above (S86: YES), in S88 the multifunction peripheral 200 transmits a timeout notification to the data processing server 100. Upon receiving the timeout notification from the multifunction peripheral 200, the data processing server 100 issues a request to the transaction server 400 to confirm the payment status for the corresponding print jobs. When the data processing server 100 receives a notification from the transaction server 400 indicating that no payment has been made for the fee (total payment amount) prepared in S79, the data processing server 100 transmits a corresponding payment pending notification to the multifunction peripheral 200. In response to receiving this payment pending notification, in S90 the multifunction peripheral 200 displays a payment pending confirmation screen on the display 240.

Figure 11:
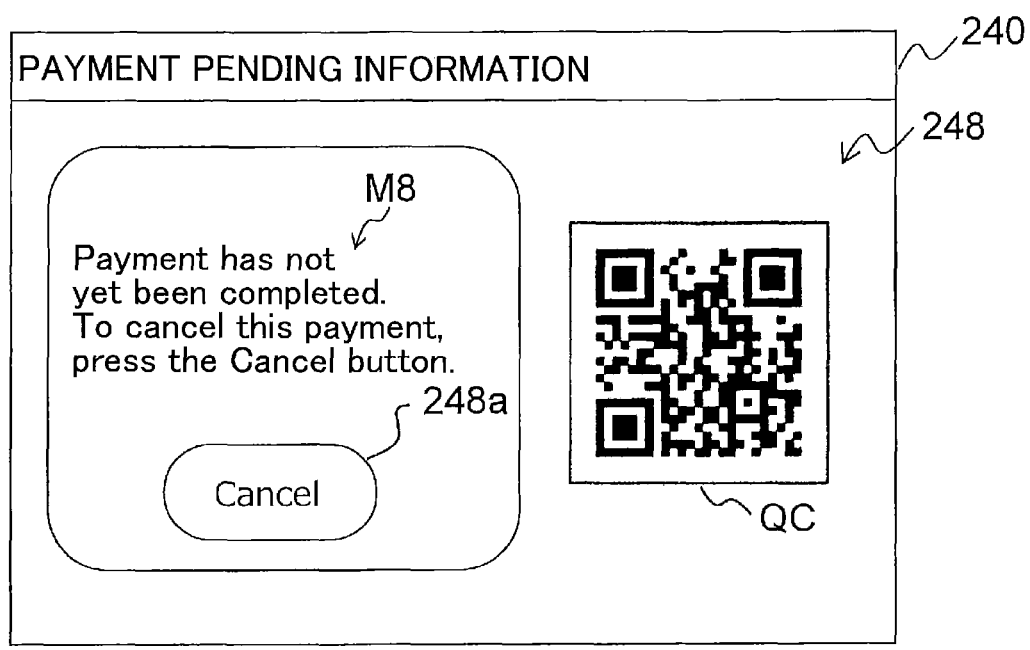
FIG. 11 is an explanatory diagram illustrating a payment pending confirmation screen displayed on the display of the multifunction peripheral.

FIG. 11 shows an example of a payment pending confirmation screen 248. The payment pending confirmation screen 248 shown in FIG. 11 includes the QR code QC, a message M8, and a "Cancel" button 248*a*. The message M8 is "Payment has not yet been completed. To cancel this payment, press the Cancel button." When the user operates the "Cancel" button 248*a* in this case, the process described above is performed from S82 and a cancellation complete notification is transmitted to the multifunction peripheral 200.

On the other hand, in a case that the user does not perform a cancellation operation as described above, in S91 of FIG. 12 the user scans the QR code QC displayed in the payment screen 249 (FIG. 10) with a scanner or camera provided in the mobile terminal 300 before the prescribed time has elapsed, or scans the QR code QC displayed in the payment pending confirmation screen 248 (FIG. 11) after the prescribed time has elapsed. In response, the mobile terminal 300 displays a payment URL screen (not shown) that includes a payment URL. By accessing the payment URL displayed in the payment URL screen, the user can display a fee display screen that includes the above calculated fee (total fee) and the like and can learn the amount that the user must pay to use the current printing service.

After viewing the fee, the user then performs appropriate operations in the fee display screen displayed on the mobile terminal 300. As a result of these operations, in S105 the mobile terminal 300 transmits a payment approval notification to the transaction server 400. The payment approval notification indicates that the user has approved of the above payment process, i.e., has agreed to pay the aforementioned fee.

After receiving the approval notification, in S107 the transaction server 400 transmits the confirmation URL to the mobile terminal 300 that corresponds to the payment URL sent to the data processing server 100 in S79 during the payment reservation. Based on this confirmation URL, in S109 the mobile terminal 300 transmits a payment completion request to the data processing server 100, and the data processing server 100 receives this request. In the meantime, the data processing server 100 repeatedly performs the determination in S111 while a payment completion request has not been received (S111: NO). When the data processing server 100 determines that a payment completion request was received (S111: YES), in S113 the data processing server 100 performs a process to confirm payment completion. Specifically, the data processing server 100 transmits the authentication information, the commodity group ID, and the transaction ID corresponding to the confirmation URL to the transaction server 400. Subsequently, the data processing server 100 receives a return code from the transaction server 400 in response.

After completing the process described above for confirming the completion of payment, in S115 the data processing server 100 transmits a payment completion notification together with the corresponding job IDs, which the multifunction peripheral 200 receives in S117. In S125 the data processing server 100 also transmits those print jobs received in S35 that were selected according to the job selection information received in S75 and for which the total amount of charges were paid all at once, as described above. In S126 the multifunction peripheral 200 receives these print jobs and subsequently in S127 controls the printing member 290 to begin printing the print jobs received in S126 on paper.

Note that the present disclosure is not limited to the data processing server 100 transmitting the print jobs to the multifunction peripheral 200 in S125 and S126 described above and the multifunction peripheral 200 printing the print jobs in S127. That is, the multifunction peripheral 200 may sequentially save print jobs received in S14 described above and in S127 may print those print jobs that were selected in S65. The process of S127 is an example of the printing step and process.

The multifunction peripheral 200 continues printing the print jobs while printing is not complete (S277: NO). Once all print jobs have been printed (S277: YES), in S279 the multifunction peripheral 200 transmits a print completion notification to the data processing server 100 together with the corresponding job IDs. In S281 the data processing server 100 receives the print completion notification from the multifunction peripheral 200 and in S283 deletes the corresponding image data from the image data storage area 125. This ends the process performed on the printing system 1.

Effects of the Embodiment

As described above, when the user of the printing system 1 according to the present embodiment selects a plurality of desired print jobs to be printed from among print jobs accumulated in the image data storage area 125 of the data processing server 100, the multifunction peripheral 200 receives the selections in S67. In S76 the data processing server 100 then determines the total fee required for executing the selected print jobs. In S79 and S81 the data processing server 100 performs preparation processes to settle payment for the plurality of print jobs altogether based on the total amount determined in S76. Once payment of the plurality of print jobs has been collectively settled through this process, the printing member 290 of the multifunction peripheral 200 performs printing based on these print jobs.

According to the embodiment described above, the data processing server 100 determines the total fee required to execute a plurality of print jobs selected by the user and settles the fees for all print jobs collectively based on this amount. By enabling the user to collectively perform payment operations for executing a plurality of selected print jobs as described above with reference to FIGS. 8, 10, 11, and the like, this method can improve user-friendliness.

The printing system 1 according to the present embodiment has the multifunction peripheral 200 with the printing member 290, and the data processing server 100. This enables various processes other than printing to be performed on the data processing server 100, which is provided separately from the multifunction peripheral 200 that performs the printing itself.

In the present embodiment, the data processing server 100 rather than the multifunction peripheral 200 determines the total fee for a plurality of selected print jobs (S76, S43) and performs a process related to settling payment of the total fee for these print jobs (S79, S81). This allows the processes for determining the total fee for print jobs being printed and for settling this total fee all at once to be performed outside the multifunction peripheral 200.

In the present embodiment, a plurality of print jobs is accumulated in the image data storage area 125 of the data processing server 100. When the user subsequently selects a plurality of these print jobs, the multifunction peripheral 200 receives these selections (S67) and transmits corresponding job selection information to the data processing server 100 (S75). Accordingly, the data processing server 100 can determine the total fee to be charged for executing the plurality of print jobs based on the job selection information received from the multifunction peripheral 200 (S76).

In the present embodiment, the multifunction peripheral 200 displays identification information for the print jobs stored in the image data storage area 125 on the display 240 in the form of a registered job list. When the user selects desired print jobs from the identification information listed on the display 240 for the plurality of print jobs, the multifunction peripheral 200 can receive these selections.

In the present embodiment, after determining the total fee to be charged for executing a plurality of print jobs, the data processing server 100 groups together all commodity IDs associated with these print jobs and assigns a single commodity group ID to this group. Next, the data processing server 100 transmits the total fee and the commodity group ID to the transaction server 400. After payment for this total fee has been settled on the transaction server 400, the multifunction peripheral 200 controls the printing member 290 to perform printing based on the plurality of print jobs. Thus, after the data processing server 100 has determined the total charges for a plurality of print jobs as described above, payment and printing of these print jobs can be performed smoothly using a single commodity group ID corresponding to this group of commodity IDs individually assigned to the print jobs.

Each time a print job is sequentially stored in the image data storage area 125 in this embodiment, the data processing server 100 determines the fee to be charged for executing that print job (S43). When a print request is subsequently inputted, the data processing server 100 totals the fees already determined for the print jobs, as described above (S76). Thus, the data processing server 100 can smoothly determine the total fee required for executing a plurality of print jobs.

In the present embodiment, each print job stored in the image data storage area 125 and the corresponding fee for that print job can be displayed in the registered job list. This enables the user to reference the displayed fees when considering whether to execute each print job.

In the present embodiment, the multifunction peripheral 200 receives print jobs transmitted from the PC 500, and the multifunction peripheral 200 transmits these print jobs to the data processing server 100. Thus, when a plurality of print jobs is received in this way, the multifunction peripheral 200 transmits the print jobs to the data processing server 100 to be sequentially stored in the image data storage area 125. When a plurality of print jobs is selected for printing from among the stored print jobs, the multifunction peripheral 200 performs this printing after the total charges are paid altogether according to the technique described above.

As described above, when printing is performed on the printing system 1 of the present embodiment based on print jobs received from a PC 500, which is outside the system, the user can perform payment operations for executing these print jobs all at once. Hence, the printing system 1 according to the present embodiment can improve user-friendliness.

In the present embodiment, the PC 500 transmits not only a print job but also a corresponding PIN code to the multifunction peripheral 200 (S13, S14). Thus, when accepting selections for print jobs as described above, the multifunction peripheral 200 prompts the user to also input the corresponding PIN codes (S71). Requiring the user to re-input the PIN code when a selecting a print job in this way can prevent the intrusion of other users and ensure security.

In the present embodiment, the PC 500 transmits not only a print job but also a corresponding user ID to the multifunction peripheral 200 (S13, S14). Thus, print jobs can be stored in association with their user IDs when accumulating a plurality of print jobs in the image data storage area 125 (S45). When print jobs accumulated in the image data storage area 125 are subsequently displayed on the display 240 as a registered job list, the multifunction peripheral 200 can limit the display to only those print jobs associated with the user ID (S63). By listing only those print jobs corresponding to the user ID at this time, the multifunction peripheral 200 does not reveal the existence of print jobs for other users, thereby ensuring security.

Variations of the Embodiment

While the disclosure has been described in detail with reference to the specific embodiment thereof, it would be apparent to those skilled in the art that various changes and modifications may be made therein without departing from the scope of the invention as described below. The variations will be described below, wherein like parts and components to the above embodiment are designated with the same reference numerals to avoid duplicating description.

(1) When Fees are not Calculated for Individual Print Jobs

Figure 13:
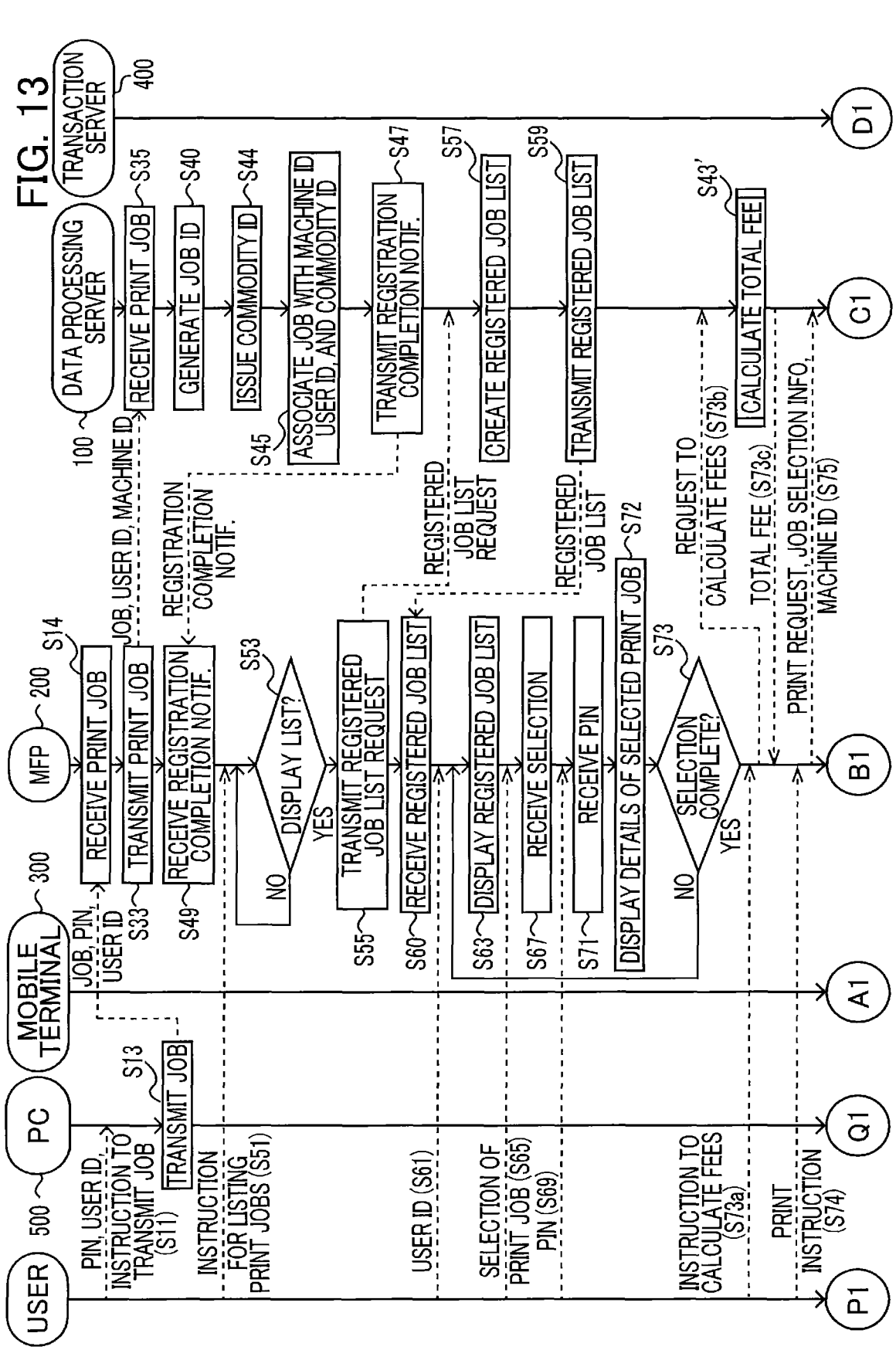
FIG. 13 is a sequence chart illustrating a process executed by the PC, the mobile terminal, the multifunctional peripheral, the data processing server, and the transaction server.

In this variation, the process in S43 of FIG. 2 according to the above embodiment for calculating the fee for an individual print job is omitted. FIG. 13, which corresponds to FIG. 2 in the embodiment, shows the main portion of the control procedure representing processes executed by the processor 210 of the multifunction peripheral 200, the processor 110 of the data processing server 100, the processor of the transaction server 400, the processor of the mobile terminal 300, and the processor of the PC 500.

As shown in FIG. 13, the same steps S11-S40 shown in FIG. 2 are executed in this variation. That is, the PC 500 transmits a print job to the multifunction peripheral 200 in response to user input, the multifunction peripheral 200 transmits this print job with a machine ID and the like to the data processing server 100, and the data processing server 100 receives this information in S35. The data processing server 100 generates the job ID for the received print job.

Figure 14:
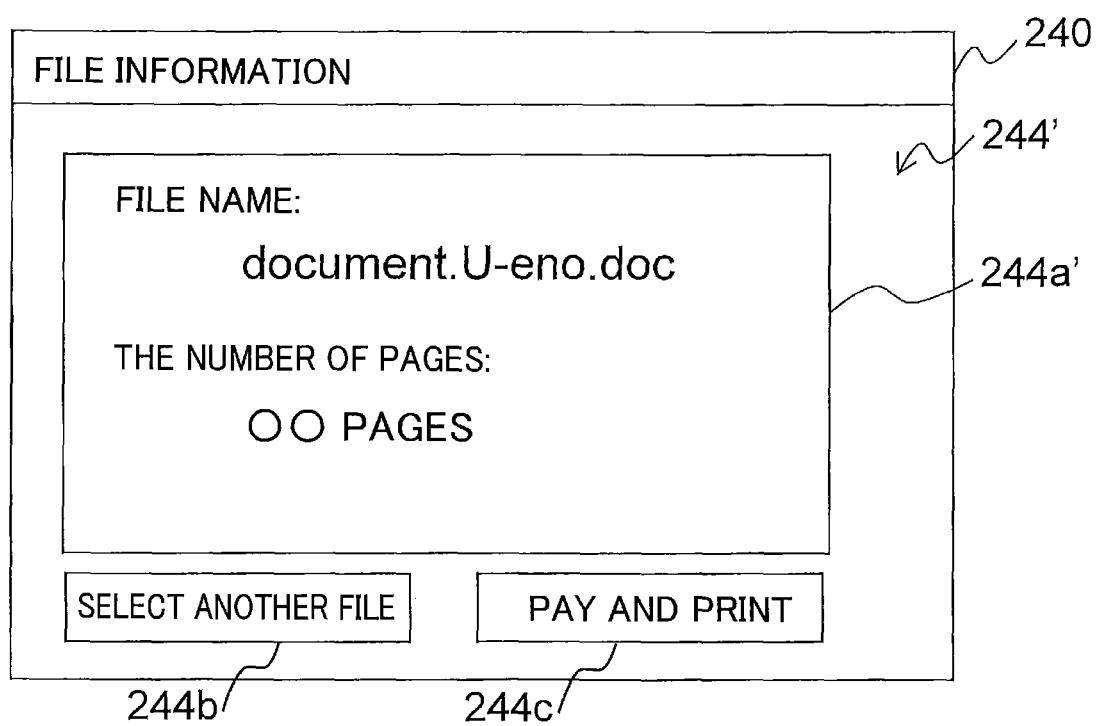
FIG. 14 is an explanatory diagram illustrating a file information display screen displayed on the display of the multifunction peripheral.

Thereafter, the data processing server 100 does not calculate the fee for the print job received from the multifunction peripheral 200 in this variation, but rather the same steps S44-S73 described in FIG. 2 are executed. Hence, after the data processing server 100 transmits the registration completion notification to the multifunction peripheral 200, the multifunction peripheral 200 displays a registered job list on the display 240, and the user sequentially selects print jobs by inputting a user ID and PIN, as described with reference to FIGS. 3 through 5. However, as shown in FIG. 14, which corresponds to FIG. 6 in the embodiment, "Fee: xx yen" is omitted from the file information field 244a' in the file information display screen 244' displayed in the present variation for confirming the selection of each print job in S72.

Next, after operating the "Pay and Print" button 244c in the file information display screen 244' (S73: YES), in S73a the user issues an instruction to calculate charges by operating the "Accept and Print" button 245c subsequently displayed in the selected jobs confirmation screen 245 of FIG. 7. When this instruction is inputted into the multifunction peripheral 200, in S73b the multifunction peripheral 200 transmits a request to calculate the corresponding charges to the data processing server 100. The request to calculate the charges is an example of the second total fee decision instruction.

In response to this request, in S43' the data processing server 100 calculates the total fee for executing the plurality of selected print jobs by using the same method described in S43 of FIG. 2. That is, the data processing server 100 first calculates the fee to be charged for each selected print job and subsequently calculates the sum of these fees as the amount the user must pay. The function of the processor 110 executing the process of S43' is an example of the second total fee calculation member. The function of the processor 110 executing the process of S43' and the subsequent process of S76 is an example of the total fee decision member. The processes of S76 and S43' are examples of the total fee decision step. As in the embodiment, this fee is calculated based on a prescribed fee table, for example. For this calculation, the data processing server 100 may also take into account the print settings stored in the print settings storage area 124. As in the embodiment described above, when performing the calculation in S43' of this variation, the data processing server 100 may also provide the user with one of the benefits described above or a suitable discount from the total amount based on the number of selected print jobs, the number of pages included in the print jobs, and the like.

According to the results of these calculations in S43', in S73c the data processing server 100 returns the payment amount to the multifunction peripheral 200, whereby the multifunction peripheral 200 displays the final confirmation screen 246 of FIG. 8 on the display 240. In response to an operation on the "Accept and Print" button 245c described above, the multifunction peripheral 200 then displays the final confirmation screen 246 of FIG. 8 on the display 240, showing the total fee for the selected print jobs in the fee confirmation field 246a, as described in the embodiment. The displayed content and subsequent processing details are the same as those described in the embodiment and, hence, a description of these details is omitted here.

This variation obtains the same effects described above in the embodiment. That is, when a plurality of print jobs has been selected for printing in this variation, the multifunction peripheral 200 transmits a request to the data processing server 100 to calculate charges (S73b), and the data processing server 100 calculates the fee for executing the plurality of print jobs (S43'). As a result, the total fee required for executing a plurality of print jobs can be smoothly determined.

(2) When the Fee Amount is Totaled Each Time a Print Job is Selected

Figure 15:
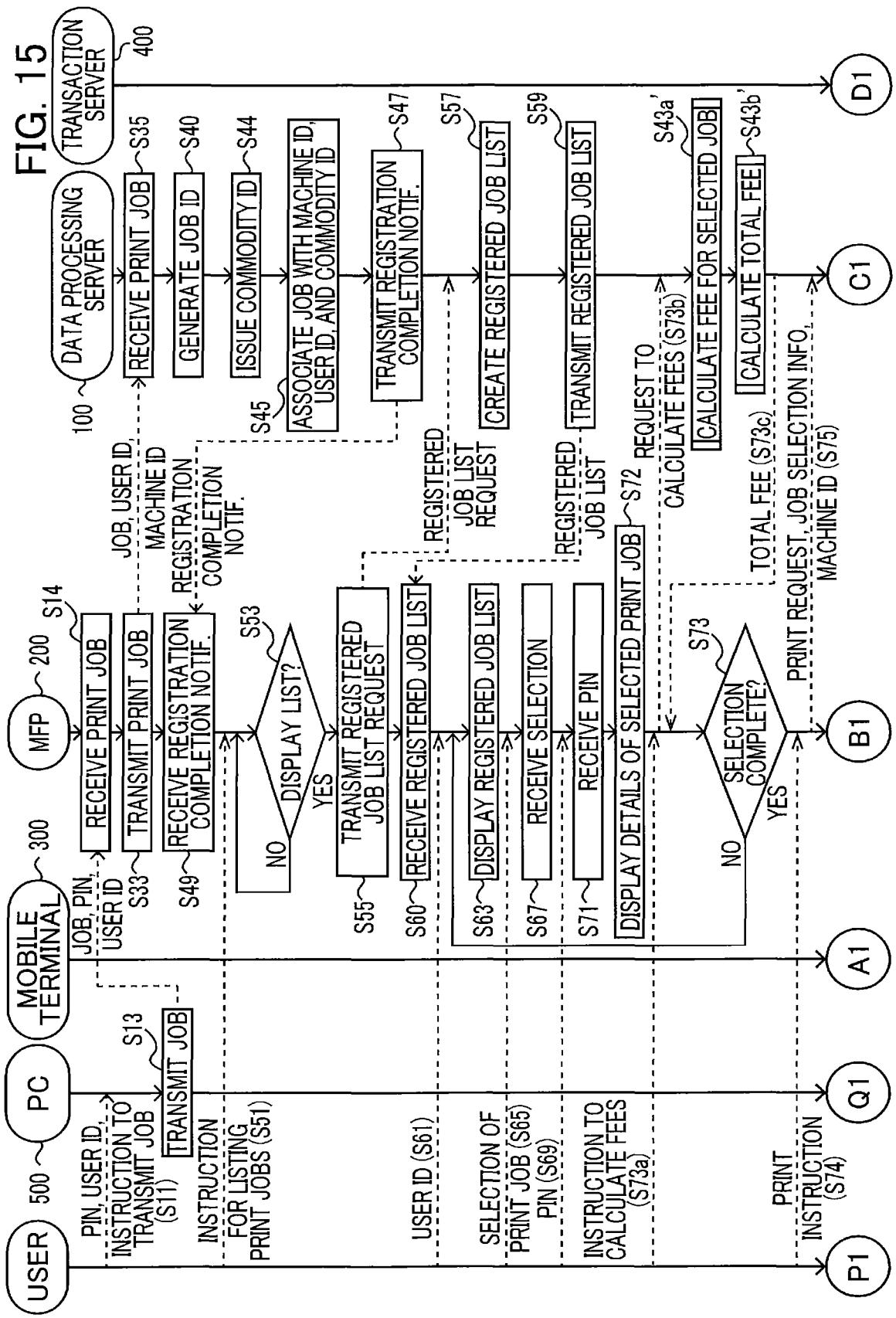
FIG. 15 is a sequence chart illustrating a process executed by the PC, the mobile terminal, the multifunctional peripheral, the data processing server, and the transaction server.

FIG. 15, which corresponds to FIG. 13 in variation (1), shows the main portion of the control procedure representing processes executed by the processor 210 of the multifunction peripheral 200, the processor 110 of the data processing server 100, the processor of the transaction server 400, the processor of the mobile terminal 300, and the processor of the PC 500 in the present variation.

Figure 16:
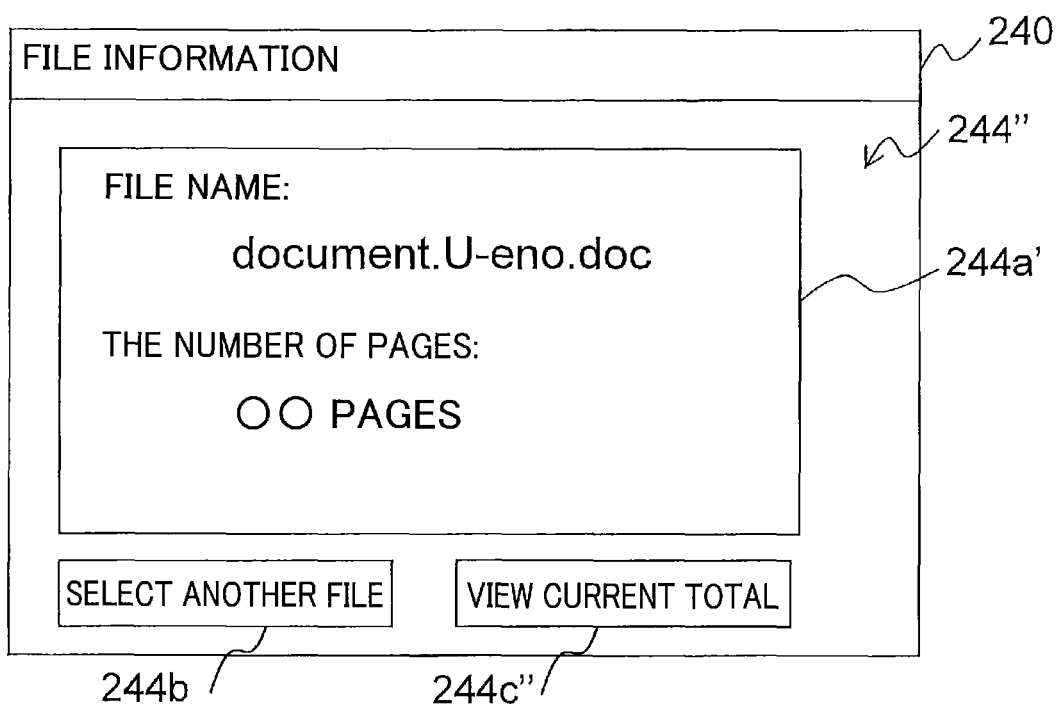
FIG. 16 is an explanatory diagram illustrating a file information display screen displayed on the display of the multifunction peripheral.

As shown in FIG. 15, the same steps S11-S72 shown in FIG. 13 are executed in this variation. That is, the PC 500 transmits a print job to the multifunction peripheral 200 in response to user input, the multifunction peripheral 200 transmits this print job to the data processing server 100 together with a machine ID and the like, and the data processing server 100 subsequently generates a job ID and stores the print job, the machine ID, and the like in association with this job ID. After the data processing server 100 sends a registration completion notification to the multifunction peripheral 200, the multifunction peripheral 200 displays a registered job list on the display 240 in response to a user operation. Next, the user sequentially selects print jobs by inputting a user ID and PIN, as described with reference to FIGS. 3 through 5. As in variation (1), in S72 of the present variation "Fee: xx yen" is omitted from the file information field 244a' of the file information display screen 244" displayed for confirming the selection of each print job, as shown in FIG. 16, which corresponds to FIG. 14 of variation (1). However, in place of the "Pay and Print" button 244c in the file information display screen 244' of FIG. 14 described above, the file information display screen 244" of the present variation is provided with a "View Current Total" button 244c'''.

By operating the "View Current Total" button 244c'''' while the file information display screen 244" in FIG. 16 is displayed, in S73a the user issues an instruction to calculate all charges the user must pay for the currently selected jobs. When this instruction is inputted into the multifunction peripheral 200, in S73b the multifunction peripheral 200 transmits a request to calculate the corresponding charges to the data processing server 100. The request to calculate the corresponding charges is an example of the third total fee decision instruction.

In response to this request, in S43a' the data processing server 100 calculates the fee for executing the single print job for which a selection was just received in S71 according to the same method described in S43 of FIG. 2. The function of the processor 110 executing the process of S43a' is an example of the second fee decision member.

In S43b' the data processing server 100 then calculates the total fee for executing all print jobs selected at that point in time. In other words, while job selections are determined in S73 described later to be ongoing (S73: NO), the data processing server 100 returns to S63, and the sequence S65→S67→S69→S71→S72→S73a→S73b→ S43a' →S43b' →S73c is repeated each time the user selects a new print job in S65. In each repetition, in S43a' the data processing server 100 calculates the fee for the print job most recently selected in S71 and in S43b' totals the results of each fee calculation executed in S43a' to that point. In other words, in the current repetition of S43b' the data processing server 100 adds the fee determined in the preceding S43a' for the print job newly selected in S65 to the total fee calculated for all print jobs selected prior to the newly selected print job. The function of the processor 110 executing the process of S43a' is an example of the third total fee calculation member. In this variation, the function of the processor 110 executing the processes of S43a' and S43b' described above and the subsequent process of S76 is an example of the total fee decision member. The processes of S43a', S43b', and S76 are an example of the total fee decision step. As described above, each fee is calculated based on a prescribed fee table, for example. For this calculation, the data processing server 100 may also take into account print settings stored in the print settings storage area 124. As described above, in S43*b*' of this variation the data processing server 100 may also provide the user with one of the benefits described above or a suitable discount from the total amount based on the number of selected print jobs, the number of pages included in the print jobs, and the like.

Figure 17A:
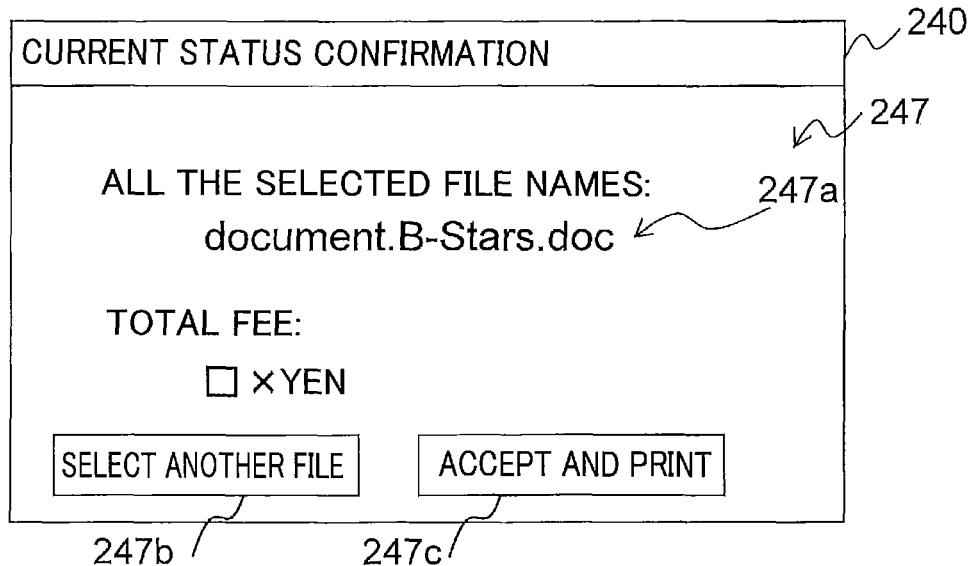
FIGS. 17A and 17B are explanatory diagrams each illustrating a current status confirmation screen displayed on the display of the multifunction peripheral.
Figure 17B:
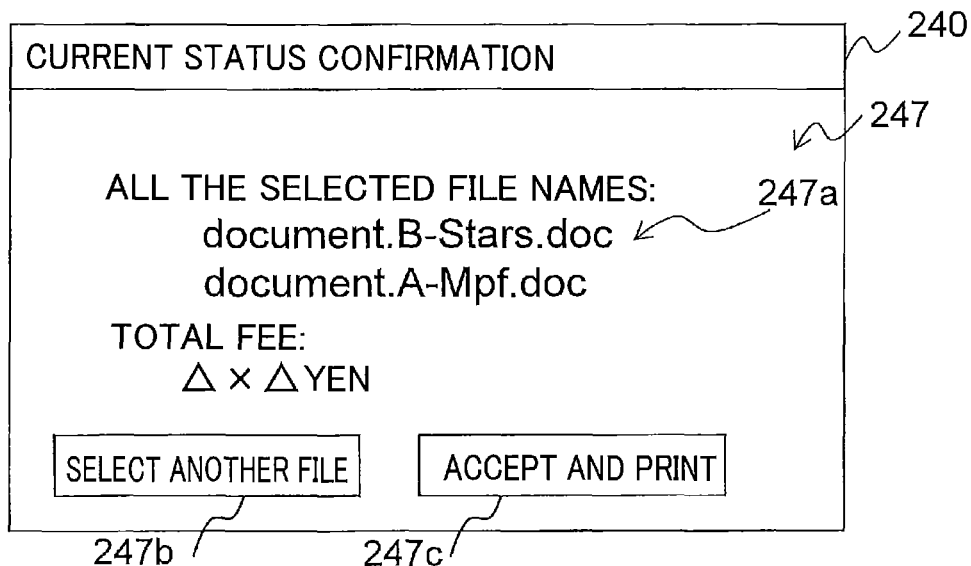

According to the results of this calculation in S43*b*', in S73*c* the data processing server 100 returns the payment amount to the multifunction peripheral 200, whereby the multifunction peripheral 200 displays a current status confirmation screen 247 shown in FIGS. 17A and 17B on the display 240. The current status confirmation screen 247 includes a fee confirmation field 247*a*, a "Select Another File" button 247*b* identical to the button 244*b* in FIG. 6, and an "Accept and Print" button 247*c* identical to the button 245*c* in FIG. 7.

The example in FIG. 17A shows a case in which only one print job had been selected at the time of this display. Hence, the single filename "document.B-stars.doc" and the corresponding total fee are displayed in the fee confirmation field 247*a*. In this case, the total fee is equivalent to the charges required for executing the single print job "document.B-stars.doc".

The example in FIG. 17B shows a case in which one more print job was selected following the state of selections shown in FIG. 17A and a total of two print jobs were selected. Consequently, the filename "document.A-Mpf.doc" for the newly added print job is displayed in the fee confirmation field 247*a* in addition to the filename "document.B-stars.doc", together with the total fee for all print jobs. Hence, the total fee in this case is the total amount to be charged for executing the print job "document.B-stars.doc" and for executing the print job "document.A-Mpf.doc".

When the user operates the "Accept and Print" button 247*c* in one of the current status confirmation screens 247 sequentially displayed, the multifunction peripheral 200 determines in S73 of this variation that job selection is complete. Here, the current status confirmation screen 247 is displayed each time one selection of the print job is made as described above. In S74 this operation serves as the final print instruction to the multifunction peripheral 200. As a result of this operation, in S75 the multifunction peripheral 200 transmits a print request corresponding to this print instruction to the data processing server 100 together with the selection results for print jobs at this point and the machine ID. The remaining process from S76 is identical to that described in the embodiment and, hence, a description has been omitted here.

This variation obtains the same effects described above in the embodiment. That is, each time a new user selection for a print job is received in S67 in this variation, in S43*a*' the data processing server 100 determines the fee to be charged for executing this print job. Subsequently, in S43*b*' the data processing server 100 adds this newly determined fee to the total amount calculated for previously selected print jobs to calculate the total fee. When a request to calculate the fee amount is inputted in S73*b*, the data processing server 100 determines the total amount for executing all selected print jobs based on the results of fees totaled to this point. Thus, the data processing server 100 can smoothly determine the total amount required for executing a plurality of print jobs.

Another feature of this variation is that each time a new user selection for a print job is received in S67, the multifunction peripheral 200 displays the selected print jobs and the total amount for executing the print jobs in the current status confirmation screen 247 (FIGS. 17A and 17B). This enables the user to reference the displayed fee when considering whether to execute the print jobs.

(3) When Scanning and Copying a Document on the Multifunction Peripheral

In the above embodiment, the PC 500 transmits print jobs including image data to the multifunction peripheral 200. However, in this variation the multifunction peripheral 200 scans an original in response to a copy operation issued by the user and executes a print job including the resulting scan data.

Process Flow

Control procedures in this variation will be described with reference to FIGS. 18 and 19, which correspond to FIG. 2 in the embodiment, and FIG. 20, which corresponds to FIG. 12. These control procedures represent processes executed by the processor 210 of the multifunction peripheral 200, the processor 110 of the data processing server 100, the processor of the transaction server 400, and the processor of the mobile terminal 300. As in the embodiment described above, references to these processors will be omitted in the following description. Further, the term "image data" in the above description of the embodiment will be replaced with the term "scan data" in the following procedures, where detailed descriptions of processes having identical content to the embodiment are omitted or simplified.

Sending/Receiving, Calculating Fees for, and Printing Print Jobs

Figure 18:
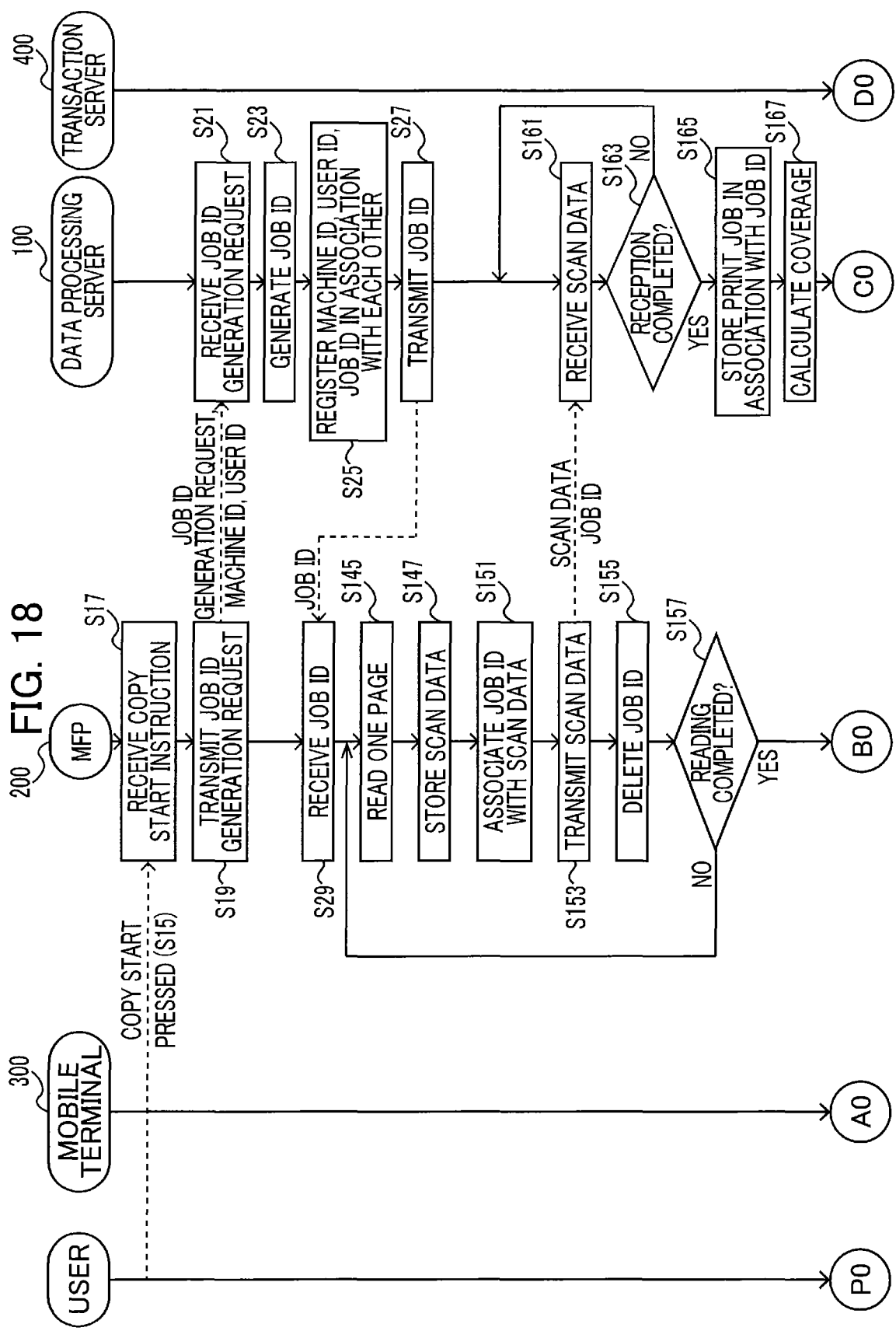
FIG. 18 is a sequence chart illustrating a process executed by the PC, the mobile terminal, the multifunctional peripheral, the data processing server, and the transaction server.

In S15 at the beginning of FIG. 18, after setting a document in the multifunction peripheral 200, the user issues an instruction to begin copying by pressing a "Copy Start" button on the operation interface 250, and in S17 the multifunction peripheral 200 receives this instruction. Input of a user ID is also received at this time through suitable operations on the operation interface 250 or via separate means.

Upon receiving the instruction in S17, in S19 the multifunction peripheral 200 transmits a job ID generation request to the data processing server 100. The job ID generation request is a request for the data processing server 100 to generate and return a job ID. Note that the multifunction peripheral 200 also transmits its machine ID, and the user ID together with the job ID generation request.

In S21 the data processing server 100 receives the job ID generation request together with the machine ID and in S23 generates a new job ID based on this information. In S25 the data processing server 100 stores the machine ID and the user ID received in S21 in association with the job ID generated in S23 and in S27 transmits the job ID to the multifunction peripheral 200. The multifunction peripheral 200 receives this job ID in S29.

Document Reading and Coverage Calculation

After receiving the job ID in S29, in S145 the multifunction peripheral 200 reads one page of the original set in the multifunction peripheral 200. In S147 the multifunction peripheral 200 saves the scan data for the read page in the data storage area 222 of the volatile storage 220. The original is an example of the reading target. The scan data is an example of the image data. Note that the scan data may simply be the image data produced when the scanning member 280 reads the scanning target or may be data produced by subjecting this image data to image processing or may be print data converted from the image data.

In S151 the multifunction peripheral 200 associates the job ID received in S29 with the scan data that was saved in the data storage area 222 in S147 and in S153 transmits the scan data and the job ID to the data processing server 100.

In S155 the multifunction peripheral 200 deletes the scan data from the data storage area 222. In the subsequent process of S157, the multifunction peripheral 200 determines whether the reading process has been completed for all pages that the user wishes to copy and repeats the process in S145-S155 when determining that the reading process is not complete (S157: NO). When the reading process has been completed for all pages that the user wishes to copy (S157: YES), the process advances to S49 described later.

In the meantime, after completing the process in S27 described above, the data processing server 100 advances to S161 to receive scan data and a job ID transmitted from the multifunction peripheral 200 in S153. The data processing server 100 continues to receive the scan data and the job ID in S161 while the reception of all scan data is not complete (S163: NO). Once all scan data has been received (S163: YES), in S165 the data processing server 100 stores a print job including all of the scan data received in S161 in the image data storage area 125 in association with the job ID received in S161. In S167 the data processing server 100 calculates the coverage of the scan data included in this print job and subsequently advances to S43 described below.

Figure 19:
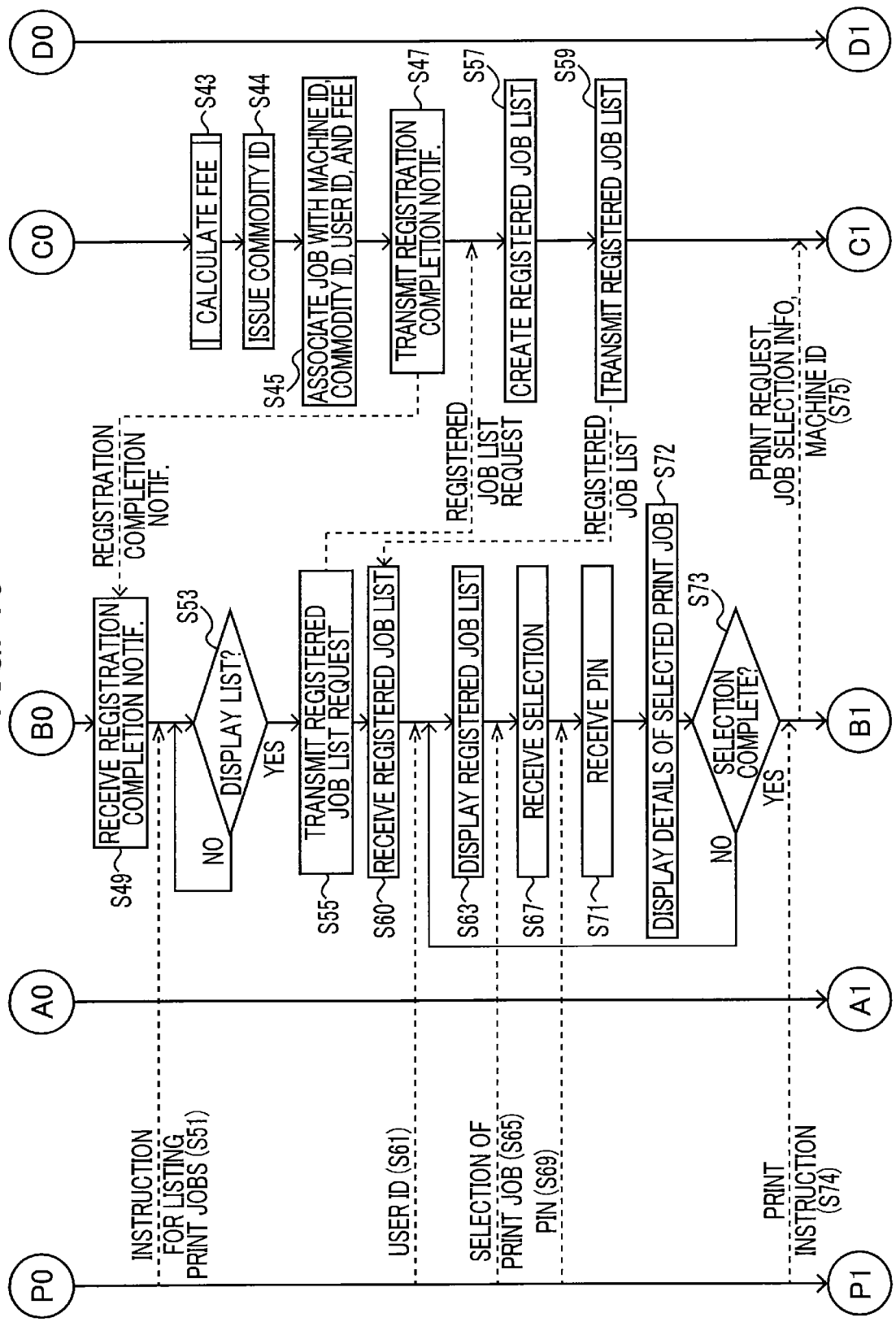
FIG. 19 is a sequence chart illustrating a successive process of the process of FIG. 18.
Figure 20:
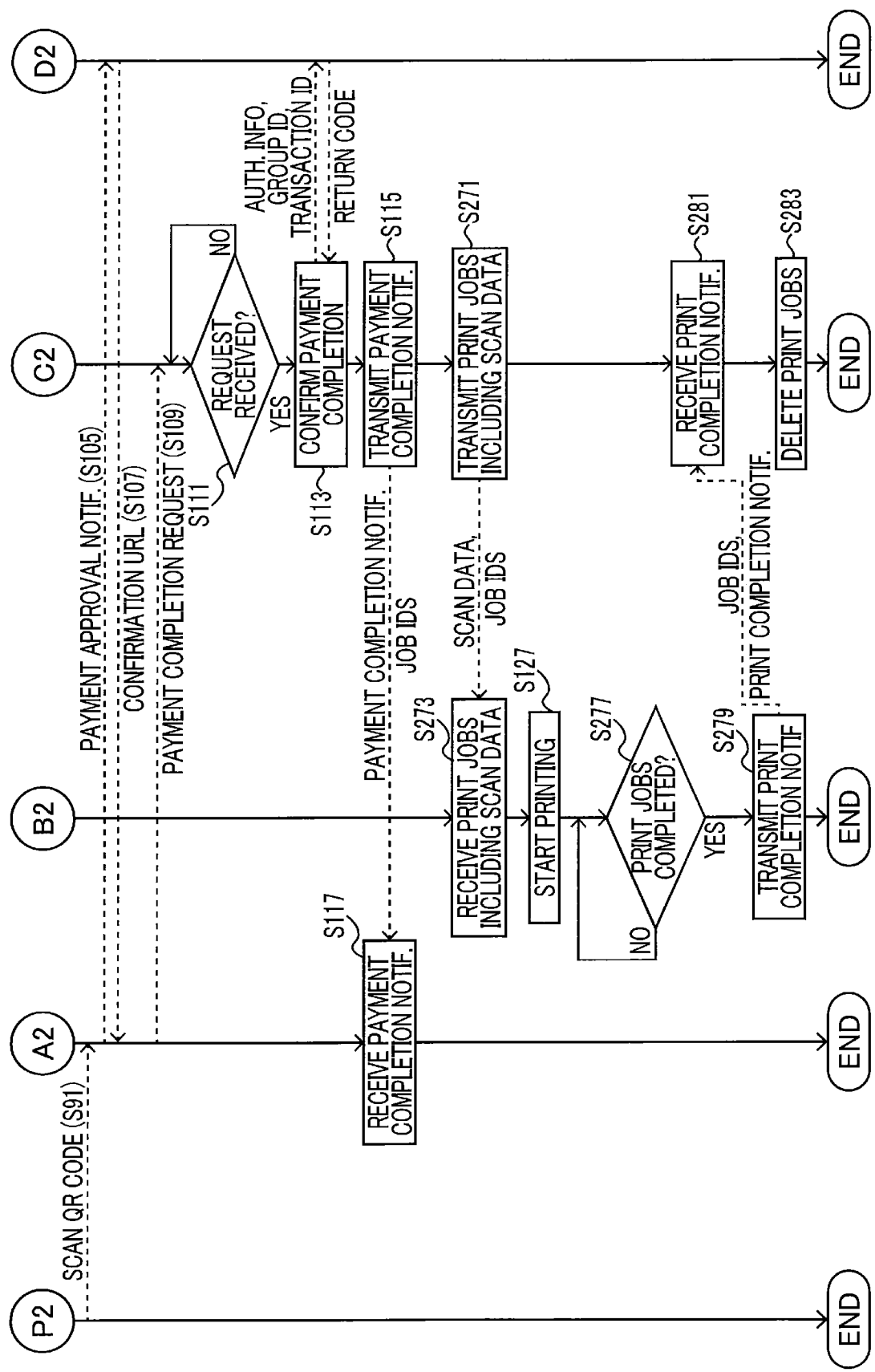
FIG. 20 is a sequence chart illustrating a successive process of the process of FIG. 9 which is performed after the process shown in FIG. 19.

Thereafter, as shown in FIG. 19, the multifunction peripheral 200 and the data processing server 100 execute the same steps S43-S75 described above in FIG. 2. That is, in S43 the data processing server 100 calculates the fee for executing the print job including the scan data received in S161, and subsequently transmits a notification to the multifunction peripheral 200 indicating that registration of the print job is complete (S47, S49).

As in the embodiment described above, the above steps from S15 through S49 are executed each time the user sets an original in the multifunction peripheral 200 and operates the "Copy Start" button in S15. During this process, each time the data processing server 100 completes the reception of scan data in S161 and S163 and generates a print job, this print job is sequentially stored in the image data storage area 125. The data storage area 125 is an example of the job accumulating member. The process of S165 is an example of the job accumulating step.

In response to a subsequent request for a registered job list from the multifunction peripheral 200, the data processing server 100 creates a registered job list and transmits this list to the multifunction peripheral 200, and the multifunction peripheral 200 displays this registered job list. In S65 the user selects a plurality of print jobs to print based on the displayed list. After the user confirms the selections, in S75 the multifunction peripheral 200 transmits a print request corresponding to the user's print instruction to the data processing server 100.

Following S75 described above, the same steps S76-S90 described above in FIG. 9 are executed on the mobile terminal 300, the multifunction peripheral 200, the data processing server 100, and the transaction server 400. Therefore, a detailed description of these steps has been omitted.

Following S90 described above, in FIG. 20 the same steps S91-S117 described above in FIG. 12 are executed on the mobile terminal 300, the multifunction peripheral 200, the data processing server 100, and the transaction server 400. In other words, after a collective settlement for all print jobs to be printed has been completed with the transaction server 400, the data processing server 100 transmits a payment completion notification, which the multifunction peripheral 200 receives in S117.

Subsequently, in S271 the data processing server 100 transmits the print jobs including the scan data saved in the image data storage area 125 to the multifunction peripheral 200 together with the corresponding job IDs. In S273 the multifunction peripheral 200 acquires the print jobs and the job IDs transmitted from the data processing server 100 in S271.

Following S273 described above, the same steps S127-S283 described above in FIG. 12 are executed on the mobile terminal 300, the multifunction peripheral 200, the data processing server 100, and the transaction server 400. Therefore, a detailed description of these steps has been omitted.

With this configuration, the present variation obtains the same effects described above in the embodiment. That is, the scan data of documents scanned by the scanning member 280 is generated, and print jobs including the generated scan data are sequentially stored in the image data storage area 125. A plurality of print jobs selected from among the jobs stored in the image data storage area 125 are printed after payment for the plurality of print jobs is collectively settled according to the same method described in the embodiment.

When printing based on the print jobs that include the scan data of the documents as described above, the printing system 1 according to the present variation enables the user to perform payment operations for executing the plurality of print jobs all at the same time, thereby improving user-friendliness.

The copy function of the multifunction peripheral 200, by which the multifunction peripheral 200 prints scan data for documents scanned by the scanning member 280, was applied to variation (3) in the above description, but this copy function may also be applied to variation (1) or variation (2) described above. In such cases, the same effects described in the variations can be obtained.

(4) Other Variations

In the above description, the multifunction peripheral 200 accepts selections for print jobs to be printed after having transmitted these print jobs to the data processing server 100, but the present invention is not limited to this method. The multifunction peripheral 200 may transmit the print jobs to the data processing server 100 after selections for the print jobs have been received. In short, as long as the system is configured to enable the user to perform collective payment for a plurality of selected print jobs, the same effects described above can be obtained.

The above examples describe cases of performing a "calculation" to determine the fee for printing, but the present disclosure is not limited to this method of determining the fee. That is, the fee table described above may include ranges for various parameters such as numbers of pages in the print job and coverages and may individually associate a fee amount with each of the ranges. In this case, the table may be referenced to determine a fee without complicated calculation.

Using the number of pages to be printed as an example, the table may record XX1 yen for a range of pages from A pages to B pages, XX2 yen for a range of pages from B pages to C pages, etc. Thus, once the number of pages is acquired from each print job, the fee can be determined directly by referencing the table without performing the complicated calculation.

In the above description, the functions for storing print jobs, accepting multiple selections of jobs to be printed, determining the total fees for executing these print jobs, performing processes related to the collective settlement of the total amount, and printing were distributed among various components of a printing system. However, all of these functions may be provided in a single printer. In this case, the printer will constitute the printing system of this specification.

In the embodiment, the multifunction peripheral 200 performs printing in the inkjet method. However, the method of printing is not limited thereto. For example, the multifunction peripheral 200 may perform printing in one of other known methods, such as, the laser method or the thermal transferring method. In such a case, the same effects can be obtained.

The sequence charts of FIGS. 2, 9, 12, 13, 15, and 18-20 are examples but not limit the present disclosure, and thus one or more steps or processes may be added deleted, and/or processing order may be modified without modifying the scope or concept of the present invention.

In addition to what has already been described, the methods according to the embodiment and its variations described above may be used in suitable combinations.

In addition, although not illustrated individually, the present disclosure may be implemented with various modifications without departing from the spirit of the disclosure.

What is claimed is:

1. A printing system comprising:
    a printer comprising a printing mechanism configured to perform printing, and a first communication interface; and
    a data processing server comprising a second communication interface,
    the printing system being configured to perform:
        storing a plurality of print jobs in a storage;
        generating a plurality of pieces of job identification information identifying respective ones of the plurality of print jobs stored in the storage; and
        receiving selections of two or more print jobs to be executed as two or more target jobs from among the plurality of print jobs stored in the storage,
        wherein the data processing server is configured to perform:
            determining a total fee to be charged for executing the two or more target jobs;
            generating one piece of group identification information in response to determination of the total fee, the one piece of group identification information being associated with two or more pieces of job identification information for identifying respective ones of the two or more target jobs among the plurality of pieces of job identification information so that the one piece of group identification information is associated with the total fee for executing the two or more target jobs;
            a settlement related process related to settlement of the determined total fee, wherein the settlement related process comprises:
                a payment reservation process to transmit, to a transaction server, the one piece of group identification information and information on the total fee associated with the one piece of group identification information and confirmation location for confirming a payment of the total fee, to cause the transaction server to transmit a payment location;
                receiving from the transaction server the payment location;
                generating a code encoding the payment location received from the transaction server;
                transmitting the code via the second communication interface to the printer, and
            wherein the printer is configured to perform executing the two or more target jobs to print images by using the printing mechanism in response to completion of settlement of the total fee, and
            wherein in the printing the two or more print jobs are executed in response to the completion of settlement of the total fee, which is associated with the one piece of group identification information, on the transaction server.

2. The printing system according to claim 1, wherein the printer further comprises
    a conveying mechanism configured to convey a printing medium.

3. The printing system according to claim 1,
    wherein the payment reservation process further comprises transmitting to the transaction server authentication information for authentication on the transaction server.

4. The printing system according to claim 3,
    wherein the data processing server performs the storing, wherein the printer performs:
        the receiving the selections of the two or more print jobs; and
        transmitting job selection information on the selected two or more target jobs to the data processing server,
    wherein the determining determines the total fee based on the job selection information.

5. The printing system according to claim 1, further comprising:
    a display;
    the printing system being configured to further perform:
        displaying on the display a job list of the plurality of print jobs stored in the storage,
    wherein the receiving receives the selections of the two or more print jobs from the displayed job list.

6. The printing system according to claim 5, configured to further perform:
    determining an individual fee for executing a print job each time the print job is stored in the storage; and
    summing the individual fees for executing the two or more target jobs in response to reception of an instruction to sum the individual fees,
    wherein the total fee is determined based on a result of summing the individual fees.

7. The printing system according to claim 6, configured to further perform:
    displaying, on the display, information on the two or more target jobs and the individual fee for each of the two or more target jobs.

8. The printing system according to claim 5, configured to further perform:
    summing individual fees for executing the two or more target jobs in response to reception of an instruction to sum the individual fees,
    wherein the total fee is determined based on a result of the summing the individual fees.

9. The printing system according to claim 5, configured to further perform:
    determining an individual fee for executing a new print job each time the receiving receives a selection of the new print job as a new target job; and
    adding the individual fee for executing the new print job to a total fee for executing all of at least one print job which is previously selected,
    wherein the total fee for executing all of the already selected two or more print jobs is determined based on a result of the adding in response to reception of an instruction to total the individual fees.

10. The printing system according to claim 9, configured to further perform:
displaying on the display all of the already selected two or more print jobs and the total fee for execution thereof.

11. The printing system according to claim 5, configured to further perform:
receiving a print job from an external device,
wherein the storing stores the print job received from the external device.

12. The printing system according to claim 11, wherein the receiving the print job receives a PIN code corresponding to the received print job,
wherein the receiving the selections of two or more print jobs receives the PIN code corresponding to each of the selected two or more print jobs.

13. The printing system according to claim 11, wherein the receiving the print job further receives user identification information corresponding to the received print job,
wherein in the storing each of the plurality of print jobs stored in the storage is associated with the corresponding user identification information,
the printing system being configured to further perform:
receiving again user identification information,
wherein the job list displayed on the display is a list of at least one print job which is associated with the user identification information received again among the plurality of print jobs stored in the storage.

14. The printing system according to claim 5, further comprising:
a reading mechanism to generate scan data by reading an original,
wherein at least one of the plurality of print jobs includes the scan data read from the reading mechanism.

15. A printing device comprising:
a printing mechanism configured to perform printing;
an operation interface; and
a controller configured to perform:
transmitting a print job to a data processing server;
receiving via the operation interface selections of two or more print jobs to be executed as two or more target jobs from among a plurality of print jobs stored in a storage managed by the data processing server;
receiving from the data processing server information related to a total fee for executing printing of the two or more target jobs;
displaying a screen having the total fee associated with the two or more target jobs, the screen further comprising an additional file selection element;
in response to an input to the additional file selection element, displaying another screen to select one or more additional print jobs;
receiving a selection of one or more additional print jobs from the another screen;
transmitting to the data processing server a request to calculate an updated total fee for executing printing of the two or more target jobs and the one or more additional print jobs selected,
receiving from the data processing server information related to the updated total fee for executing printing of the two or more target jobs and the one or more additional print jobs, the updated total fee being determined by adding a fee for the one or more additional print jobs to a fee for the two or more target jobs;
displaying a screen having the updated total fee; and
executing the two or more target jobs and the one or more additional print jobs to print images by using the printing mechanism in response to completion of settlement of the updated total fee, the updated total fee being charged for executing the two or more target jobs and the one or more additional print jobs.

16. A printing method comprising:
storing a plurality of print jobs;
generating a plurality of pieces of job identification information identifying respective ones of the plurality of print jobs stored;
receiving selections of two or more print jobs to be executed as two or more target jobs from among the plurality of print jobs stored;
determining a total fee to be charged for executing the two or more target jobs;
generating one piece of group identification information in response to determination of the total fee, the one piece of group identification information being associated with two or more pieces of job identification information for identifying respective ones of the two or more target jobs among the plurality of pieces of job identification information so that the one piece of group identification information is associated with the total fee for executing the two or more target jobs;
transmitting, to a transaction server, a payment reservation request including the one piece of group identification information, information on the total fee associated with the one piece of group identification information and confirmation location for confirming a payment of the total fee, the payment reservation request being configured to cause the transaction server to transmit a payment location;
receiving payment information including the payment location from the transaction server; generating a code encoding the payment location received from the transaction server;
transmitting the code via a printer; and
transmitting payment completion information generated from the payment information to the printer so that print images based on the two or more target jobs are generated in the printer after completion of settlement of the total fee.

17. A non-transitory computer readable storage medium storing a set of program instructions executed by a computer included in a printing device, the printing device further including a printing mechanism configured to perform printing and an operation interface, the set of program instructions, when executed by the computer causes the computer to perform:
transmitting a print job to a data processing server;
receiving via the operation interface selections of two or more print jobs to be executed as two or more target jobs from among a plurality of print jobs stored in a storage managed by the data processing server;
receiving from the data processing server information related to a total fee for executing printing of the two or more target jobs;
displaying a screen having the total fee associated with the two or more target jobs, the screen further comprising an additional file selection element;
in response to an input to the additional file selection element, displaying another screen to select one or more additional print jobs;
receiving a selection of one or more additional print jobs from the another screen;

transmitting to the data processing server a request to calculate an updated total fee for executing printing of the two or more target jobs and the one or more additional print jobs selected, receiving from the data processing server information related to the updated total fee for executing printing of the two or more target jobs and the one or more additional print jobs, the updated total fee being determined by adding a fee for the one or more additional print jobs to a fee for the two or more target jobs;

displaying a screen having the updated total fee; and executing the two or more target jobs and the one or more additional print jobs to print images by using the printing mechanism in response to completion of settlement of the updated total fee, the updated total fee being charged for executing the two or more target jobs and the one or more additional print jobs.

* * * * *